(12) United States Patent
Franklin et al.

(10) Patent No.: US 10,235,402 B1
(45) Date of Patent: Mar. 19, 2019

(54) TECHNIQUES FOR COMBINING GRID-ENCODED DATA STORAGE SYSTEMS

(71) Applicant: Amazon Technologies, Inc., Seattle, WA (US)

(72) Inventors: Paul David Franklin, Seattle, WA (US); Adam Frederick Brock, Seattle, WA (US); James Caleb Kirschner, Seattle, WA (US); Bryan James Donlan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 414 days.

(21) Appl. No.: 14/973,712

(22) Filed: Dec. 17, 2015

(51) Int. Cl.
*G06F 17/30* (2006.01)

(52) U.S. Cl.
CPC .. *G06F 17/30321* (2013.01); *G06F 17/30584* (2013.01)

(58) Field of Classification Search
CPC ......... G06F 17/30864; G06F 17/30321; G06F 17/30613
USPC ....................................................... 707/741
See application file for complete search history.

(56) References Cited

U.S. PATENT DOCUMENTS

| | | | |
|---|---|---|---|
| 5,729,671 A | 3/1998 | Peterson et al. | |
| 6,249,836 B1 | 6/2001 | Downs et al. | |
| 6,779,150 B1 | 8/2004 | Walton et al. | |
| 6,862,362 B2 | 3/2005 | Gangadhar | |
| 7,117,294 B1 | 10/2006 | Mi et al. | |
| 7,142,150 B2 | 11/2006 | Thackray | |
| 7,380,129 B2 | 5/2008 | Keohane et al. | |
| 7,490,013 B2 | 2/2009 | Wells | |
| 7,693,813 B1 | 4/2010 | Cao et al. | |
| 7,783,600 B1 | 8/2010 | Spertus et al. | |
| 7,805,706 B1 | 9/2010 | Ly et al. | |

(Continued)

FOREIGN PATENT DOCUMENTS

WO 2014047073 A1 3/2014

OTHER PUBLICATIONS

IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).

(Continued)

*Primary Examiner* — Hosain T Alam
*Assistant Examiner* — Robert F May
(74) *Attorney, Agent, or Firm* — Davis Wright Tremaine LLP

(57) ABSTRACT

One or more grids of redundancy coded shards, such as those stored or otherwise represented on grid encoded storage systems, are combinable or extensible. For example, a generator matrix of a redundancy code may be configured so as to have a sufficient number of fields to generate a grid. The generator matrix may initially be used to generate smaller grids, which can be combined into the target grid without re-encoding most or all of the data represented thereon. In some cases, vertically derived shards of the input grids may be combined using, e.g., matrix addition, which may then be directly allocated to the target grid, while data shards and horizontally derived shards may be allocated to the target grid with no further transformation.

26 Claims, 11 Drawing Sheets

(56) References Cited

U.S. PATENT DOCUMENTS

| | | |
|---|---|---|
| 7,930,611 B2 | 4/2011 | Huang et al. |
| 8,261,033 B1 | 9/2012 | Slik et al. |
| 8,386,841 B1 | 2/2013 | Renade |
| 8,413,187 B1 | 4/2013 | Del Sesto et al. |
| 8,479,078 B2 | 7/2013 | Resch et al. |
| 8,504,518 B1 | 8/2013 | Ghemawat et al. |
| 8,504,535 B1 * | 8/2013 | He .................. G06F 17/30902 |
| | | 707/695 |
| 8,612,219 B2 | 12/2013 | Tsuchinaga et al. |
| 8,621,069 B1 | 12/2013 | Tompkins |
| 8,706,980 B2 | 4/2014 | Dhuse et al. |
| 8,769,049 B2 | 7/2014 | Murphy et al. |
| 8,788,855 B2 | 7/2014 | Cong et al. |
| 8,806,296 B1 | 8/2014 | Lazier |
| 8,850,288 B1 | 9/2014 | Lazier et al. |
| 8,868,825 B1 | 10/2014 | Hayes et al. |
| 8,869,001 B1 | 10/2014 | Lazier |
| 8,935,221 B1 | 1/2015 | Lazier et al. |
| 8,935,761 B2 | 1/2015 | Gladwin et al. |
| 8,938,591 B2 | 1/2015 | Mark et al. |
| 8,959,067 B1 | 2/2015 | Patiejunas et al. |
| 8,984,363 B1 | 3/2015 | Juels et al. |
| 8,984,384 B1 | 3/2015 | Juels et al. |
| 9,002,805 B1 | 4/2015 | Barber et al. |
| 9,003,144 B1 | 4/2015 | Hayes et al. |
| 9,009,491 B2 | 4/2015 | Resch |
| 9,021,297 B1 | 4/2015 | Hayes et al. |
| 9,047,214 B1 | 6/2015 | Northcott |
| 9,052,942 B1 | 6/2015 | Barber et al. |
| 9,092,441 B1 | 7/2015 | Patiejunas et al. |
| 9,110,797 B1 | 8/2015 | Lazier |
| 9,165,002 B1 | 10/2015 | Lazier |
| 9,208,018 B1 | 12/2015 | Northcott et al. |
| 9,213,485 B1 | 12/2015 | Hayes et al. |
| 9,213,709 B2 | 12/2015 | Patiejunas et al. |
| 9,218,244 B1 | 12/2015 | Hayes et al. |
| 9,223,789 B1 | 12/2015 | Seigle et al. |
| 9,225,675 B2 | 12/2015 | Patiejunas et al. |
| 9,244,761 B2 | 1/2016 | Yekhanin et al. |
| 9,250,811 B1 | 2/2016 | Patiejunas |
| 9,251,097 B1 * | 2/2016 | Kumar ................ G06F 12/1408 |
| 9,256,761 B1 | 2/2016 | Sahu et al. |
| 9,271,052 B2 | 2/2016 | Holden |
| 9,281,845 B1 | 3/2016 | Lazier |
| 9,298,760 B1 | 3/2016 | Li et al. |
| 9,354,683 B2 | 5/2016 | Patiejunas et al. |
| 9,378,084 B2 | 6/2016 | Calder et al. |
| 9,405,333 B1 | 8/2016 | Pine |
| 9,448,614 B2 | 9/2016 | Slik |
| 9,459,959 B1 | 10/2016 | Franklin et al. |
| 9,495,249 B1 | 11/2016 | Franklin et al. |
| 9,495,255 B2 | 11/2016 | Davis et al. |
| 9,513,820 B1 | 12/2016 | Shalev |
| 9,563,681 B1 | 2/2017 | Patiejunas et al. |
| 9,672,110 B1 * | 6/2017 | Patel .................. G06F 11/1092 |
| 9,753,669 B2 | 9/2017 | Ben-Shaul et al. |
| 9,785,495 B1 | 10/2017 | Lazier et al. |
| 9,792,179 B1 | 10/2017 | Lazier |
| 9,825,625 B2 | 11/2017 | Thalheim |
| 9,825,652 B1 | 11/2017 | Lazier |
| 9,838,041 B1 | 12/2017 | Lazier |
| 9,838,042 B1 | 12/2017 | Lazier |
| 9,853,662 B1 | 12/2017 | Lazier et al. |
| 9,866,242 B1 | 1/2018 | Lazier |
| 9,904,589 B1 * | 2/2018 | Donlan ................ G06F 11/10 |
| 9,923,966 B1 | 3/2018 | Franklin et al. |
| 9,998,539 B1 | 6/2018 | Brock et al. |
| 2003/0172325 A1 | 9/2003 | Wyatt et al. |
| 2004/0040025 A1 | 2/2004 | Lehtinen |
| 2004/0054997 A1 | 3/2004 | Katragadda et al. |
| 2004/0128470 A1 | 7/2004 | Hetzler et al. |
| 2004/0230764 A1 | 11/2004 | Merchant et al. |
| 2004/0268037 A1 | 12/2004 | Buchanan et al. |
| 2006/0004675 A1 | 1/2006 | Bennett et al. |
| 2006/0064709 A1 | 3/2006 | Throckmorton et al. |
| 2006/0080574 A1 | 4/2006 | Saito et al. |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2007/0118657 A1 | 5/2007 | Kreitzer et al. |
| 2007/0124020 A1 | 5/2007 | Staples |
| 2007/0156842 A1 | 7/2007 | Vermeulen et al. |
| 2007/0180294 A1 | 8/2007 | Kameyama et al. |
| 2007/0245331 A1 | 10/2007 | Daynes et al. |
| 2008/0189705 A1 | 8/2008 | Weinert et al. |
| 2009/0094250 A1 | 4/2009 | Dhuse et al. |
| 2009/0319078 A1 | 12/2009 | Jackson |
| 2010/0131792 A1 | 5/2010 | Herrod |
| 2010/0138764 A1 | 6/2010 | Hatambeiki et al. |
| 2010/0153941 A1 | 6/2010 | Borissov et al. |
| 2010/0306267 A1 | 12/2010 | Zamkoff et al. |
| 2010/0318999 A1 | 12/2010 | Zhao et al. |
| 2010/0328528 A1 | 12/2010 | Eggert |
| 2010/0332751 A1 | 12/2010 | Quigley et al. |
| 2011/0022633 A1 | 1/2011 | Bemosky et al. |
| 2011/0055661 A1 | 3/2011 | Grube et al. |
| 2011/0078277 A1 | 3/2011 | Baptist |
| 2011/0202929 A1 | 8/2011 | Schleimer et al. |
| 2011/0225209 A1 | 9/2011 | Volvovski et al. |
| 2011/0225426 A1 | 9/2011 | Agarwal et al. |
| 2011/0264717 A1 | 10/2011 | Grube et al. |
| 2011/0289263 A1 | 11/2011 | McWilliams et al. |
| 2011/0296195 A1 | 12/2011 | Nakagawa et al. |
| 2011/0296440 A1 | 12/2011 | Laurich et al. |
| 2012/0011398 A1 | 1/2012 | Eckhardt et al. |
| 2012/0017096 A1 | 1/2012 | Snider |
| 2012/0079189 A1 | 3/2012 | Colgrove et al. |
| 2012/0079190 A1 | 3/2012 | Colgrove et al. |
| 2012/0110150 A1 | 5/2012 | Kosuru et al. |
| 2012/0185437 A1 | 7/2012 | Pavlov et al. |
| 2012/0243687 A1 | 9/2012 | Li et al. |
| 2012/0254089 A1 | 10/2012 | Alba et al. |
| 2012/0254175 A1 | 10/2012 | Horowitz et al. |
| 2012/0254690 A1 | 10/2012 | Resch et al. |
| 2012/0290539 A1 | 11/2012 | Bryant et al. |
| 2012/0322422 A1 | 12/2012 | Frecks, Jr. et al. |
| 2012/0331088 A1 | 12/2012 | O'Hare et al. |
| 2013/0007511 A1 | 1/2013 | Gaertner et al. |
| 2013/0029641 A1 | 1/2013 | Hickie |
| 2013/0073600 A1 | 3/2013 | Jenkins et al. |
| 2013/0109371 A1 | 5/2013 | Brogan et al. |
| 2013/0191527 A1 | 7/2013 | Ashok et al. |
| 2013/0238932 A1 | 9/2013 | Resch |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2014/0006458 A1 | 1/2014 | Hsieh et al. |
| 2014/0006850 A1 | 1/2014 | Aliev et al. |
| 2014/0007214 A1 | 1/2014 | Qureshi et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0108421 A1 | 4/2014 | Isaacson et al. |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0344446 A1 | 11/2014 | Rjeili et al. |
| 2014/0351632 A1 | 11/2014 | Grube et al. |
| 2014/0372383 A1 | 12/2014 | Sipek |
| 2014/0380126 A1 | 12/2014 | Yekhanin et al. |
| 2015/0149870 A1 | 5/2015 | Kozat |
| 2015/0169716 A1 * | 6/2015 | Franklin ........... G06F 17/30575 |
| | | 707/610 |

(56) References Cited

U.S. PATENT DOCUMENTS

| | | |
|---|---|---|
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0216991 A1 | 7/2016 | Ansari et al. |
| 2016/0335310 A1 | 11/2016 | Lahiri et al. |
| 2017/0024281 A1 | 1/2017 | Franklin et al. |
| 2017/0060687 A1 | 3/2017 | Franklin et al. |
| 2017/0222814 A1 | 8/2017 | Oberhauser et al. |
| 2017/0250801 A1 | 8/2017 | Chen et al. |
| 2017/0331896 A1 | 11/2017 | Holloway et al. |

OTHER PUBLICATIONS

Third-Party Submission Under 37 CFR 1.290 dated Apr. 24, 2018, U.S. Appl. No. 15/283,017, filed Sep. 30, 2016, 10 pages.
"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.
Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.
Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.
Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.
Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.
Franco, "Understanding Bitcoin: Cryptography, Engineering and Economics," Wiley, Nov. 24, 2014, 167 pages.
He et al., "Elastic Application Container: A Lightweight Approach for Cloud Resource Provisioning," 26th IEEE International Conference on Advanced Information Networking and Applications, Mar. 26, 2012, pp. 15-22.
International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), 204 pages.
International Organization for Standardization/International Electrotechnical Commission, "Information technology—Trusted Platform Module—Part 4: Commands," International Standard, ISO/IEC 11889-4:2009(E), 254 pages.

International Search Report and Written Opinion in International Patent Application No. PCT/US2015/050513, dated Feb. 16, 2016, 22 pages.
International Search Report and Written Opinion dated Aug. 25, 2016, International Patent Application No. PCT/US2016/040510, filed Jun. 30, 2016.
International Search Report and Written Opinion dated Feb. 4, 2016, International Patent Application No. PCT/US2015/059983, 12 pages.
International Search Report and Written Opinion dated Nov. 22, 2017, International Patent Application No. PCT/US2017/054319, filed Sep. 29, 2017, 14 pages.
Kim, "How Sharding Works," Medium, Dec. 5, 2014 [retrieved Nov. 17, 2017], https://medium.com/@jeeyoungk/how-sharding-works-b4dec46b3f6, 12 pages.
MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Soltesz et al., "Container-based operating system virtualization: a scalable, high-performance alternative to hypervisors," ACM SIGOPS Operating Systems Review 41(3):275-287, Mar. 2007.
Storer et al., "Potshards—A Secure, Recoverable, Long-Term Archival Storage System," ACM Transactions on Storage, Published Jun. 2009, vol. 5, No. 2, Article 5, pp. 5:1 to 5:35.
Swan, "Blockchain: Blueprint for a New Economy," O'Reilly Media, Inc., Jan. 22, 2015, 144 pages.
Thiele et al., "Embedded Software in Network Processors—Models and Algorithms," Lecture Notes in Computer Science 2211:416-34, Oct. 8, 2001.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance evaluation of container-based virtualization for high performance computing environments," Parallel, Distributed and Network-Based Processing (PDP), 2013 21st Euromicro International Conference, Feb. 2013, pp. 233-240.
Zhao et al., "Experimental study of virtual machine migration in support of reservation of cluster resources," Proceedings of the 2nd international workshop on Virtualization technology in distributed computing, Nov. 2007, pp. 1-8.
Zheng et al., "Grid-partition index: a hybrid method for nearest-neighbor queries in wireless location-based services," The VLDB

(56) References Cited

OTHER PUBLICATIONS

Journal—The International Journal on Very Large Data Bases 15(1):21-39, online publication Jul. 22, 2005, print publication Jan. 1, 2006.
Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.

* cited by examiner

TECHNIQUES FOR COMBINING GRID-ENCODED DATA STORAGE SYSTEMS

CROSS-REFERENCE TO RELATED APPLICATIONS

This application incorporates by reference for all purposes the full disclosure of co-pending U.S. patent application Ser. No. 14/741,409, filed Jun. 16, 2015, entitled "ADAPTIVE DATA LOSS MITIGATION FOR REDUNDANCY CODING SYSTEMS," U.S. patent application Ser. No. 14/789,778, filed Jul. 1, 2015, entitled "INCREMENTAL MEDIA SIZE EXTENSION FOR GRID ENCODED DATA STORAGE SYSTEMS," U.S. patent application Ser. No. 14/789,783, filed Jul. 1, 2015, entitled "GRID ENCODED DATA STORAGE SYSTEMS FOR EFFICIENT DATA REPAIR," U.S. patent application Ser. No. 14/789,789, filed Jul. 1, 2015, entitled "CROSS-DATACENTER EXTENSION OF GRID ENCODED DATA STORAGE SYSTEMS," U.S. patent application Ser. No. 14/789,799, filed Jul. 1, 2015, entitled "CROSS-DATACENTER VALIDATION OF GRID ENCODED DATA STORAGE SYSTEMS," U.S. patent application Ser. No. 14/789,810, filed Jul. 1, 2015, entitled "INCREMENTAL UPDATES OF GRID ENCODED DATA STORAGE SYSTEMS," U.S. patent application Ser. No. 14/789,815, filed Jul. 1, 2015, entitled "NON-PARITY IN GRID ENCODED DATA STORAGE SYSTEMS," U.S. patent application Ser. No. 14/789,825, filed Jul. 1, 2015, entitled "REBUNDLING GRID ENCODED DATA STORAGE SYSTEMS," U.S. patent application Ser. No. 14/860,706, filed Sep. 21, 2015, entitled "EXPLOITING VARIABLE MEDIA SIZE IN GRID ENCODED DATA STORAGE SYSTEMS," U.S. patent application Ser. No. 14/789,837, filed Jul. 1, 2015, entitled "DETERMINING DATA REDUNDANCY IN GRID ENCODED DATA STORAGE SYSTEMS," U.S. patent application Ser. No. 14/973,708, filed concurrently herewith, entitled "TECHNIQUES FOR EXTENDING GRIDS IN DATA STORAGE SYSTEMS," and U.S. patent application Ser. No. 14/973,716, filed concurrently herewith, entitled "FLEXIBLE DATA STORAGE DEVICE MAPPING FOR DATA STORAGE SYSTEMS."

BACKGROUND

Modern computer systems make extensive use of network computing and network data storage systems. Such use has proliferated in recent years, particularly in distributed or virtualized computer systems where multiple computer systems may share the performance of the tasks associated with the computer system. Such computer systems frequently utilize distributed data storage in multiple locations to store shared data items so that such data items may be made available to a plurality of consumers. The resources for network computing and network data storage are often provided by computing resource providers who leverage large-scale networks of computers, servers and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, has increased the importance of balancing both data availability and data integrity on such network computing and network data storage systems. For example, data archival systems and services may use various types of error correcting and error tolerance schemes to ensure data integrity and the expense of data availability leading to a degraded customer experience due to delays in retrieving the data from the data archive.

BRIEF DESCRIPTION OF THE DRAWINGS

Various techniques will be described with reference to the drawings, in which.

DETAILED DESCRIPTION

Figure 1:
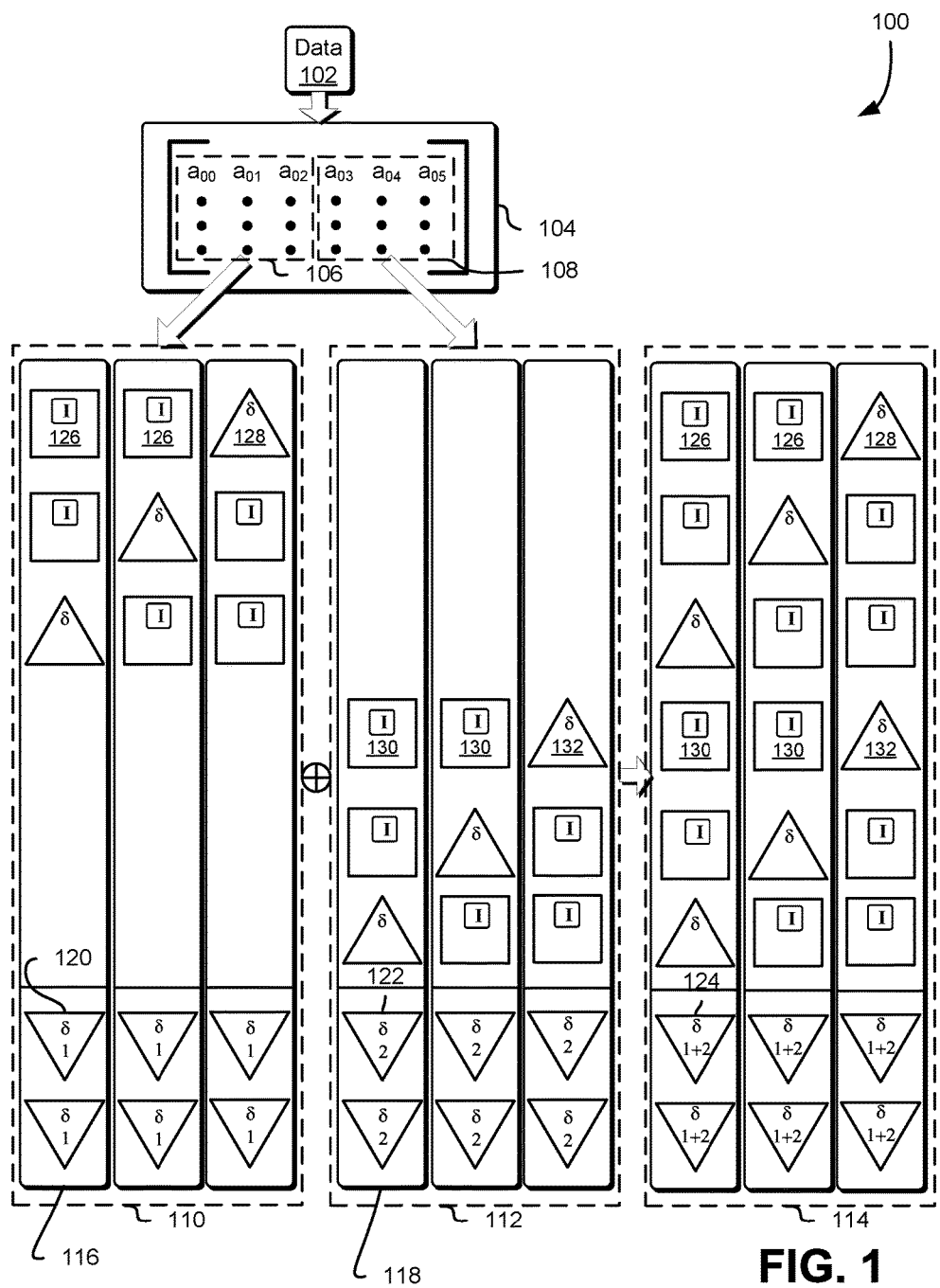
FIG. 1 illustrates an example environment in which a generator matrix is used to generate initial grids of shards to be combined into a target grid, in accordance with some embodiments.

Techniques described and suggested herein include methods, systems, and processes for storing original data of data archives on data storage systems using grid encoding techniques. Grid encoding techniques may be applied to data archives of a computing resource service provider by implementing the storage techniques described herein to increase, for example, availability, redundancy, and durability while minimizing the number of extra storage volume required. In many grid encoding techniques, the stretch factor (i.e., the number of storage volumes required store a volume's worth of data) can approach theoretical minimums as is detailed further herein. Application of such grid encoding techniques allows the storage of original data of the individual archives and redundant storage in other archives, while providing ways to recover from extensive loss of many storage devices and even the recovery of data after the loss of entire data storage facilities.

Data items, which may also be referred to herein as "data archives," "data objects," or more simply as "data," may be received from customers of a computing resource service provider for storage using a grid storage service. Data archives may be received from an archival storage service. Data archives may also be received from other services provided by the computing resource service provider including, but not limited to, redundant storage services, block storage services, virtual machine services, or other such services.

Using a grid encoding technique, data items stored within the grid may be grouped into a collection of shards where each shard represents a logical distribution of the data items stored in the grid. A shard, as used herein, is a logical representation of a set of data stored in the grid and while, in some embodiments, a grid of shards is a partitioning of the data stored in the grid (i.e., each shard is a disjoint set of data items), in other embodiments, shards contain data items that are also stored in other shards. For example, a grid of shards (as described herein) is an abstract representation of a set of storage device locations that are used to store the grid encoded data storage system associated with the grid. Each shard of the grid may be a data shard (i.e., may be configured to store data), a derived shard (i.e., configured to store redundancy encoded representations of that data), a "null" shard (i.e., a virtual or purely abstract shard), or a combination of these. Shards may have an associated set data and/or metadata associated with the shard and/or the grid (e.g., the row and column index of the shard within the grid). Unless otherwise stated or made clear from context, the data items that are represented by the shard and stored in the grid are referred to herein as "shard data" and the data and/or metadata associated with the shard and/or the grid are referred to herein as "shard metadata."

Each shard may have an associated data storage device and/or an associated data storage volume. A collection of shards may include one or more data shards (e.g., shards associated with data in the data archives), one or more derived shards (e.g., shards associated with grid encoded data associated with the data in the data archives), and/or one more null shards (e.g., shards that are empty and/or are not associated with any data). As used herein, the term "shard" may be used to refer to the data storage abstraction of a shard (i.e., the logical storage device), the associated data storage device of the shard (i.e., the physical storage device), and/or the associated data storage volume of the shard. The shards may be stored using a collection of data storage devices including, but not limited to, tape drives, tapes, disk drives (including both solid state drives and spinning drives), removable media, computer memory, flash drives, various magnetic media, and/or other such storage devices. Each data archive may be stored on one or more data storage devices of the collection of data storage devices, including both homogenous and heterogeneous collections of data storage devices such as, for example, sets of tape drives, sets of disk drives, or sets containing both tape drives and disk drives.

A grid of shards may include a plurality of data shards and one or more derived shards. A grid of shards may also include only derived shards, provided those derived shards are consistent with the redundancy encoding scheme of the grid of shards. The derived shards may include a set of corresponding derived shards for each dimension of the grid. For example, in a two-dimensional grid of shards, the corresponding derived shards may include one or more horizontally derived shards, and one or more vertically derived shards. In a grid of shards, the quantity of derived shards is at least equal to a minimum number of shards required to implement a grid encoding scheme associated with the collection of shards in each dimension. In a first example, a collection of shards may contain two data shards containing data and one derived shard as required to implement parity encoding in the horizontal dimension and may also include three "rows" with a fourth row of vertically derived shards as required to implement a parity encoding in the vertical dimension. Such a grid would include six data shards (two in each of the first three rows), three horizontally derived shards (one in each of the first three rows), and three-vertically derived shards (in the fourth row). As used herein, a derived shard required in association with a parity encoding, which may be referred to as a parity shard, may be configured to store the "exclusive or" (denoted "XOR" or "⊕") of the data stored in the other (e.g., data and/or derived) shards.

In an illustrative example, a first simple sixteen-bit data shard may contain "0010 1011 0110 1011" and a second simple sixteen-bit data shard may contain "0100 1101 0100 1011." The XOR of these two simple sixteen-bit data shards is "0110 0110 0010 0000" and this XOR value (e.g., the value obtained from XORing the two simple sixteen-bit data shards) may then be stored in a parity shard. As described herein, a parity encoding is a linear redundancy encoding scheme based on XOR operations. With two data shards and a parity shard, one of the three values may be lost, and the lost value can be reconstructed from the XOR of the remaining two values. For example, if the first data shard is designated "A," the second data shard is designated "B," and the parity shard is designated "C," then $A \oplus B = C$, $A \oplus C = B$, and $B \oplus C = A$ (i.e., any of the shards can be reconstructed from the other two). Storing the "exclusive or" of the data shards ensures that even parity is maintained over the three shards because, if $A \oplus B = C$, then $A \oplus B \oplus C = 0$. Single parity shards may also be used with larger quantities of data shards to the same effect, allowing the reconstruction of any single lost data value. An additional property of a shard is that a portion of a shard can be reconstructed from corresponding portions of the other shard. In the illustrative example above, each of the four-bit groups of data in the sixteen bit parity shard may be interpreted as a four-bit parity shard for the corresponding four-bit values in data shard "A" and data shard "B."

Similar redundancy encoding techniques may be used in other dimensions of the grid or, in some embodiments, more complex redundancy encoding techniques are used. In a more complex example, four data shards may be combined with two corresponding derived shards (for a total of six shards in the collection of shards) to allow the reconstruction of up to two lost shards (also referred to herein as "damaged shards") where the lost shards may be data shards, they may be derived shards, or they may be one of each. Reconstruction of shards in such an example may require redundancy codes such as, for example, an online code, a Luby transform code, a Reed-Solomon code, a Cauchy Reed-Solomon code, a regenerating code, a maximum distance separable code, a repetition code, a cyclic code, a Hamming code, a Reed-Muller code, a Goppa code, a BCH code, a Golay code, an expander code, a linear block code, a linear erasure code, and/or some other redundancy code.

In some embodiments, the grid is encoded with a linear block code such as those described herein. A linear block code allows vertically derived shards such as those described herein to be repaired using the horizontal redundancy encoding scheme of the grid. In some embodiments, the grid is encoded with maximum distance separable codes such as those described herein. A maximum distance separable code allows shards to be derived from any sufficiently large subset of the set of shards in the bundle to be used to reproduce any of the other shards. So, for example, in a 6:4 encoding (e.g., an encoding with six shards, four of which are data shards and two of which are derived shards that are derived using a 6:4 redundancy encoding scheme) with a maximum distance separable code, any four of the shards could be used to reproduce a lost and/or damaged shard of the bundle (i.e., either four data shards, three data shards and one derived shard, or two data shards and two derived shards).

A collection of shards may have any arbitrary number of null shards added to the collection of shards without affecting the redundancy code associated with the collection of shards. For example, because a parity encoding is based on the parity of the data shards, and because a null shard (i.e., a shard with all zeros or an empty shard) does not affect that parity, adding a null shard to that set maintains that parity and, inductively, adding an arbitrary number of null shards to the collection of shards also does not affect that parity. The addition of null shards to collections of shards with more complex redundancy codes also does not affect the more complex redundancy code associated with the collection of shards (e.g., Reed-Solomon codes or Cauchy codes) because the application of such codes to additional null shards simply adds null terms to the associated redundancy encoding calculations. This property of a grid holds when, for example, the grid encoding scheme includes one or more linear block codes as described above. Such linear block codes (e.g., parity, Reed-Solomon) may express the encoding operation as a matrix multiplication of the vector of inputs (e.g., the shards in the grid) with a linear encoding matrix (also referred to herein as a "generator matrix").

Each shard of a collection of shards may also be padded with any arbitrary corresponding number of zero values (i.e., the arbitrary number of zero values corresponding to each shard) without affecting the redundancy encoding associated with the collection of shards when a linear block code is used. It should be noted that when a linear block code is used to do erasure encoding in a grid, the input data stream (i.e., the data objects) is parsed into a stream of symbols (also referred to herein as "slicing"). Symbols at the same offset are then grouped together and the grouped symbols are encoded (using, for example, the linear block code) into a set of output code words. The code can then be made systematic by fixing some set of the code words, decoding them to obtain the input symbols, and then deriving the remaining code words. In some embodiments, the vertical and horizontal linear erasure codes used for a grid encoding scheme must be linear in the same field (as described below) to support such encoding and decoding.

Linear block coding allows appending zeros because such appending is equivalent to fixing a set of code words to be zero, decoding those zero code words to also be a set of zero symbols, and encoding again to obtain a set of zero code words for the remaining code word positions. The padding of a shard with an amount of data (e.g., zero values) may be illustrated using the previously described example of a first simple sixteen-bit data shard that contains "0010 1011 0110 1011" and a second simple sixteen-bit data shard that contains "0100 1101 0100 1011." The XOR of these two simple sixteen-bit data shards is "0110 0110 0010 0000" as described above. Padding each of the shards with "0000 0000" does not change the redundancy encoding calculation since "0010 1011 0110 1011 0000 0000"⊕"0100 1101 0100 1011 0000 0000" is "0110 0110 0010 0000 0000 0000" (i.e., the result is similarly padded with "0000 0000"). Other properties associated with padding shards with an arbitrary number of zero (or "null") values are described below.

In the following description, various techniques will be described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment in which a generator matrix is used to generate initial grids of shards to be combined into a target grid, in accordance with some embodiments.

A customer device or other entity connects with a data storage service, such as over a network, so as to transact sets of data 102 to be stored as, e.g., a grid of shards on volumes of durable storage associated with the data storage service. The incoming data 102 is processed by the data storage service using, e.g., a redundancy code implementing a generator matrix 104, so as to generate a grid of shards therefrom. The generator matrix may be configured so as to be capable of generating an output grid 114 of the eventual desired size (or, in some embodiments, larger than the eventual desired size), but may also be configurable to generate smaller initial grids 110, 112 which are combinable to generate the output grid 114 using techniques further described herein.

The customer device may be any computing resource or collection of such resources enabling the customer to interface with the data storage system, such as in a programmatic fashion (e.g., via web service call or application programming interface call), and transact data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network may be a communication network, such as the Internet, an intranet or an Internet service provider (ISP) network. Some communications from the customer device to the data storage system may cause the data storage system to operate in accordance with one or more embodiments described or a variation thereof. The front end through which the data storage service 106, as well as other services as further described herein, operates, may be any entity capable of interfacing via the network with the customer device, as well as various other components of a data storage system, so as to coordinate and/or direct data and requests to the appropriate entities. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The set of data 102 may be produced by a program, process, application, module, service, or system associated with a computing resource service provider as described herein. The set of data may also be produced by a user or customer of the computing resource service provider, and submitted to the computing resource service provider via a customer device and transmitted via a network. The set of data may include volatile data, which may be added to, changed, and/or deleted from in response to, for example, one or more requests (e.g., application programming interface requests or "API requests") made by the user or customer of the computer system. The set of data may also include non-volatile data (also referred to herein as "static data"), which may be at least partially unchanging as the one or more requests are received.

The data stored across the durable storage volumes, such as in a grid of shards 110, 112, 114, may have an associated durability that may be based on, for example, an annual failure rate ("AFR") of the data storage volume or the mapped data storage volume. For a given AFR, it may be assumed that the daily failure rate ("DFR") for the data storage volume or the mapped data storage volume is the AFR divided by three-hundred and sixty-five (i.e., the number of days in a year) and the hourly failure rate ("HFR") of the data storage volume or the mapped data storage volume is the DFR divided by twenty-four (i.e., the number of hours in a day). For example, if a data storage volume or the mapped data storage volume has an AFR of 2 percent, the data storage volume or the mapped data storage volume has a DFR of 0.0055 percent and an HFR of 0.00023 percent.

When the data is migrated or otherwise stored via the data storage service, the data storage service may store the data using one or more redundancy encoding techniques such as those described herein. For example, the data storage service may encode the data by producing one or more data shards 126, 130 and may store the one or more data shards on one or more volumes of a set of volumes of durable storage configured to store the redundancy encoded data as described herein. Depending on the redundancy encoding technique used by the data storage service, some or all of the shards stored may consist entirely of original data (identity shards 126, 130) or derived data (derived shards 120, 122, 124, 128, 132). In some embodiments, the shards may be apportioned on a one-to-one basis to the volumes of durable storage. Accordingly, in such embodiments, some volumes may include directly readable, original data (identity shards), while others contain only derived data (derived shards). In the illustrated example, the data is stored as a grid of shards such that a minimum quorum quantity of the shards within the grid, either vertically in a column 116, 118 and/or horizontally in a row (e.g., across columns), may be used to reconstruct any of the data represented therewith.

If, for example, the illustrated grid of shards 116 (or 118) has a minimum quorum quantity of two shards out of the three illustrated in a given row within the grid, any two of that row of shards—regardless of whether the shard is an identity shard 126 or a derived shard 128, may be processed using the redundancy code so as to regenerate the data. Additionally, the original data may be regenerated by directly reading the identity shards, e.g., 126.

It should be noted that, as used herein, the durability of data and/or data storage may be separate from the redundancy of the data in the data storage. For example, data stored in preliminary storage may be highly durable (i.e., have a very low failure rate) but may not be redundant if, for example, it is stored as a single copy. Conversely, data stored using one or more redundancy encoding techniques such as those described herein and while such data may be less durably stored (i.e., may have fewer "9's" of durability), it may be highly redundant. For example, data stored in a grid may have no fewer than four separate copies of the data (one of the data shard, one from the horizontally-derived shards, one from the vertically-derived shards, and one from the remaining shards). If the grid is geographically distributed into, for example, multiple datacenters in multiple geographic regions, the data may have greater redundancy due to the added tolerance for loss of a complete datacenter.

The generator matrix 104, as previously mentioned, may be configured so as to generate a grid of shards of varying sizes (e.g., 116, 118, 114). Each initial (constituent) grid 116, 118 generated using the generator matrix 108 may be generated using a designated portion of the generator matrix. For example, the first portion 106 may be used to generate the shards of initial grid 110, while the second portion 108 may be used to generate the shards of initial grid 112. The portions 106, 108 may be designated by, e.g., matrix or shard index, such as by ranges of shard indices, from which the shards of a given grid may be generated.

However, by virtue of being generated using the same generator matrix 104, the initial (constituent) grids 110, 112 can be combined into a larger, output (target) grid 114 without recalculating or regenerating the derived shards 128, 132, either horizontally or vertically. In some embodiments, the "empty" spaces within the initial grids 110, 112 are populated with null shards, e.g., corresponding to shard indices outside of the range designated by the portion 106, 108 of the generator matrix 104 used to generate that grid. In some embodiments, the initial grids 110, 112 are combined by performing a matrix operation, such as matrix addition, of each shard of the first initial grid 116 with its corresponding shard (null or otherwise) in the second initial grid 118. Thus, with regards to the data shards 126, 130 and the derived shards 128, 132, those shards may simply be allocated or copied from the respective initial grid 116, 118 to the combined output grid 114 with little or no computation.

The vertically derived shards 120, 122 are, in the illustrated example, also combined using matrix operations, such as matrix addition. As the derived shards 120 of the first grid 110 and the derived shards 122 of the second grid 112 have the same relative position (e.g., same row indices), matrix addition of the respective shards 120, 122 generate combined vertically derived shards 124, which are then allocated to the same relative position (e.g., row indices) in the output grid 114. Such combination may use partial sum reconstruction techniques described elsewhere in this disclosure and the disclosures incorporated herein by reference.

After combination, the output grid 114 retains the horizontal reconstruction characteristics of the input grids 116, 118 (e.g., if two of three shards, as illustrated, are sufficient to reconstruct any of the shards in a given row in the input grids 116, 118, two of three shards are sufficient to reconstruct any of the shards in a given row in the target grid 114). However, the vertical redundancy changes; in the illustrated example, while the data represented by the initial grids 110, 112 may be vertically reconstructable with a total of four vertically derived shards 120, 122 associated with that data, when combined into the output grid 114, only two vertically derived shards 124 are available for vertical reconstruction within a given column after combination. Such techniques may be used to optimize the level of vertical redundancy for the failure and other operational characteristics of the implementing system.

Figure 2:
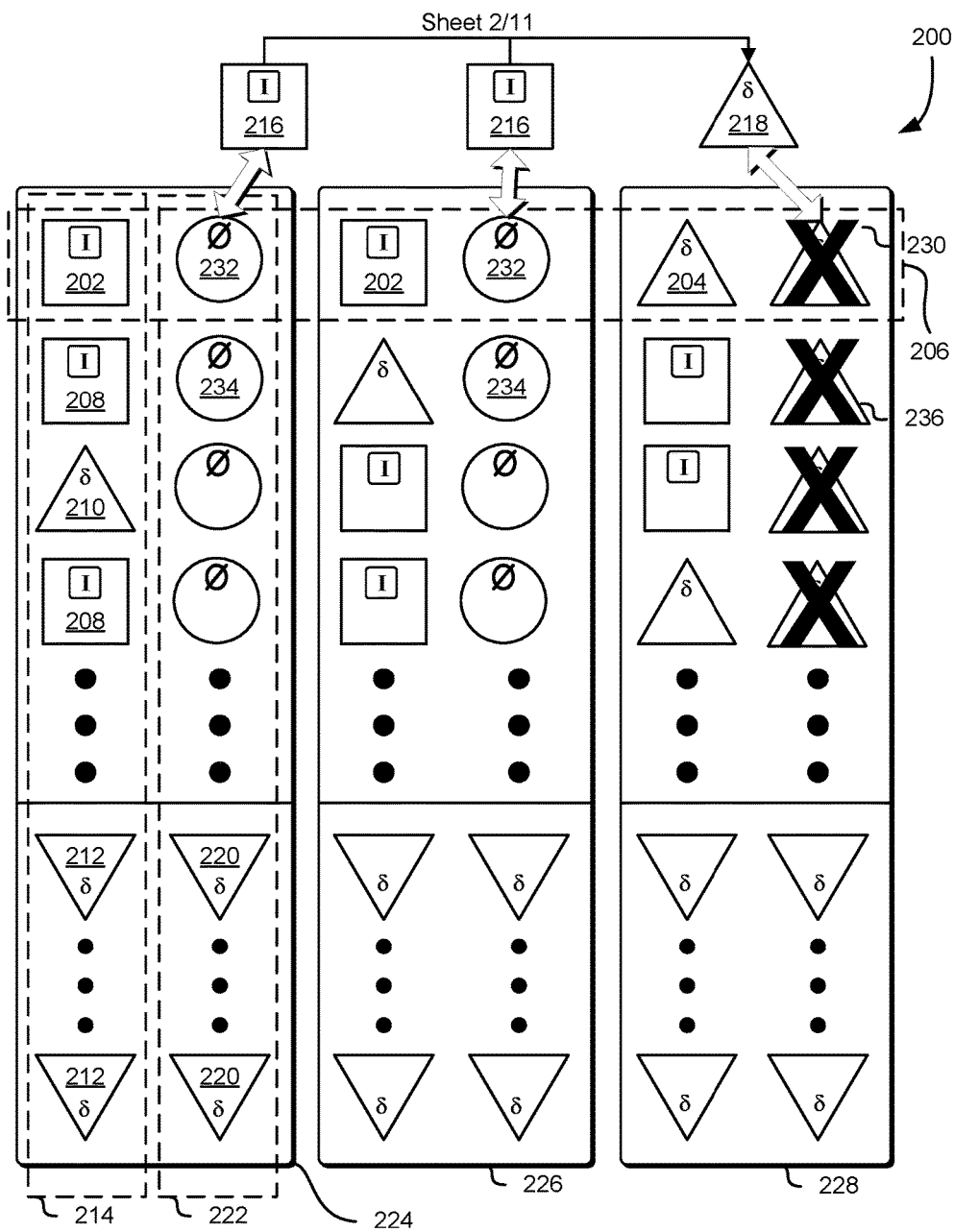
FIG. 2 illustrates an example environment in which a grid of shards can be extended to include further columns of shards by use of null shards, in accordance with some embodiments.

FIG. 2 illustrates an example environment in which a grid of shards can be extended to include further columns of shards by use of null shards, in accordance with some embodiments.

An initial grid of shards as illustrated in FIG. 2 may include, for example, a set of columns 224, 226, 228 respectively associated with, e.g., a set of datacenters of a data storage system. Each set of columns 224, 226, 228 may initially include, respectively, a column 214 of data shards 202, 208 and derived shards 210, 212, and a column 222 of null shards 232, 234. In some embodiments, the column 222 having null shards may also have vertically derived shards 220, which may also be null (by virtue of being derived from a set of null shards 232, 234). Furthermore, for a given row of shards 230, one or more of the columns not initially having data shards 202, 204 may include a horizontally derived shard 230 marked or otherwise treated as failed (and, in some embodiments, may in fact be another null shard which is treated by an administering system as a failed derived shard. In some embodiments, in columns not initially having data shards 202, 204, the failed derived shard may be considered a "virtual" shard, which may be considered a placeholder (in some cases) or, in the alternative, is a derived shard that initially includes data derived from both data shards (and/or other derived shards) as well as null shards.

In the initial state, such a grid may, e.g., be treated as a smaller initial grid having, as in the illustrated case, three shards per row, which may for example be implemented such that two of the shards in a given row are sufficient to regenerate any of the three in the row 206. When additional data is to be added to the grid, in some embodiments, the new data is added on a per-row basis. In other words, all null shards 232 in a given row of the grid are populated at a given time. In the illustrated example, the null shards 232 in row 206 are converted to data shards 216. A new derived shard 218 is generated, placed where the failed derived shard 230 previously was, and, in some embodiments, derived shard 204 is also updated (rederived) to reflect the new scheme and additional data shards. The illustrated example demonstrates a 3:2 initial grid moving to a 6:4 scheme, horizontally.

In connection with the horizontal update just described, the vertical shards in the newly populated column 222 (and other columns likewise updated) are updated (e.g., rederived) to reflect the conversion. In some embodiments, an implementing system may delay the updating of vertically derived shards 220 until multiple rows 206 are populated with data, so as to batch together row-wise updates when recalculating the vertically derived shards. Similarly, incoming data may be delayed from migrating to a given row until a sufficient amount of data is available to fully populate that row 206.

Figure 3:
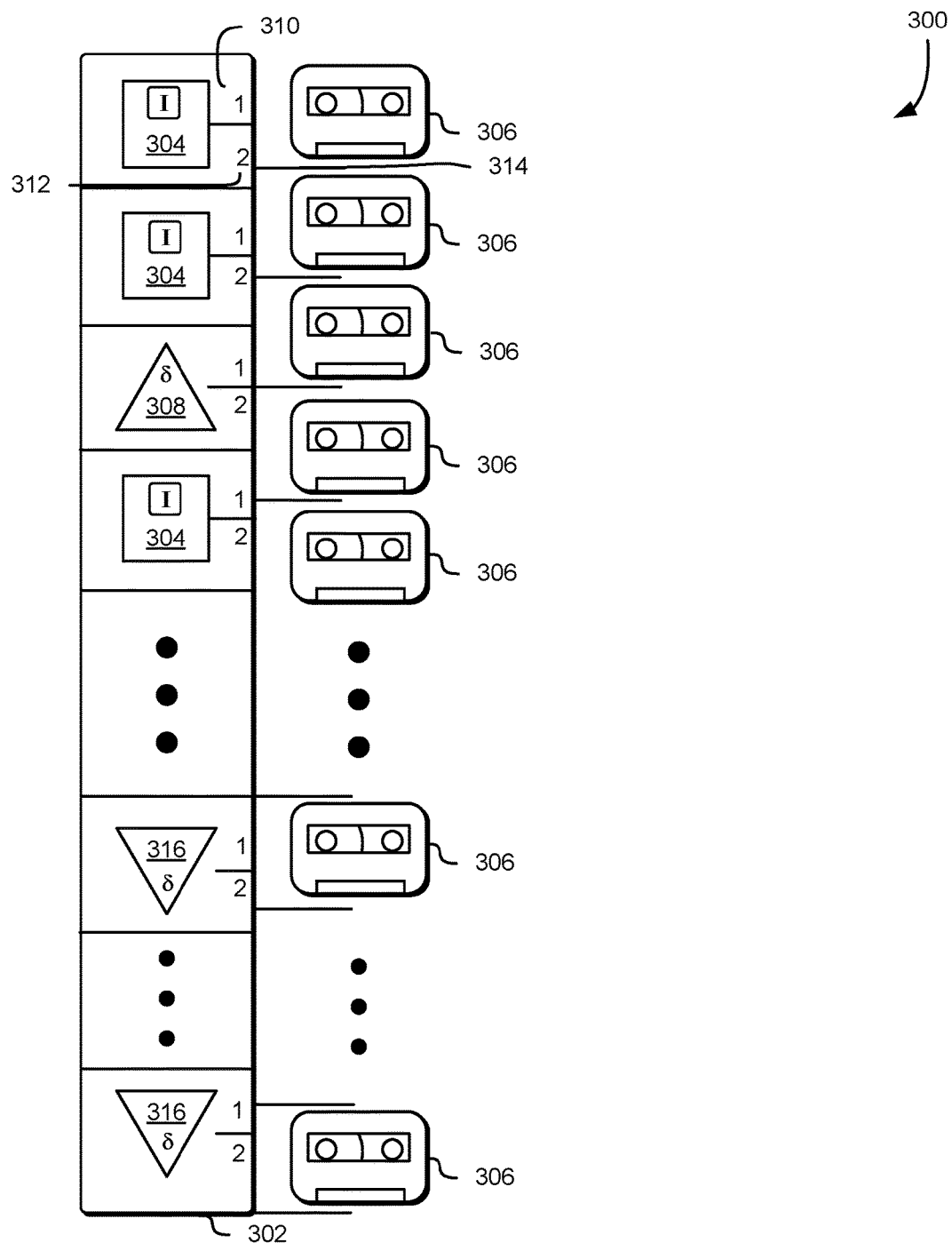
FIG. 3 illustrates an example environment in which a bundle or grid of shards may be flexibly mapped to a set of data storage devices, in accordance with some embodiments.

FIG. 3 illustrates an example environment in which a bundle or grid of shards (e.g., data shards 304, derived shards 308, 316, of which some may be vertically derived 316 if the redundancy coding scheme is a grid encoding scheme) may be flexibly mapped to a set of data storage devices, in accordance with some embodiments. A column (e.g., of a grid) or bundle of shards 302 to be stored on a set of data storage devices 306, the quantity of which may not necessarily equal the number of shards to be stored on the set, are mapped to a logical storage layer that is apportioned into addressable zones 310. The addressable zones 310 may correspond to address ranges of the shards 304, 308, 316, and in some embodiments, the addressable zones 310 are allocated so as to be of equal size (e.g., the address ranges of the shards to which they map are of equal size).

The shards themselves may be generated, using a redundancy coding scheme as described elsewhere herein and in the incorporated disclosures, to be of a size specified in connection with characteristics of the data storage devices 306 to which they will be stored. For example, the shard size may be generated so as to be no larger than the smallest available capacity of any medium within the set of data storage devices, so as to limit association of a given medium within the set to no more than two shards.

The set of data storage devices is then allocated, in some embodiments independently of the shards or the addressable zones, in a continuum according to their available capacity, which may vary between media of the set of storage devices 306. As illustrated, the first storage medium 306 is associated with the first two addressable zones, but not all of the second one (and thus does not fully store the first shard 304. When data requests (such as read, write, or repair requests) arrive, in some embodiments, they are executed on a per-zone 310 basis, and the mechanisms may differ based on whether the request involves a read, a write, a repair, or some combination thereof, on the associated data storage medium.

For example, if the second medium 306 goes offline and a repair is needed, the repair may be performed on a per-zone 310 basis such that the second addressable zone associated with the first shard is first repaired and written to a different, available medium, thereby bringing the first shard fully online, then the first and second addressable zones associated with the second shard is repaired, thereby bringing the second shard online. Accordingly, the durability calculations for the shards remains unperturbed even if the data storage media are logically decoupled from the boundaries of the shards themselves, thereby increasing storage efficiency (e.g., less slack space).

Figure 4:
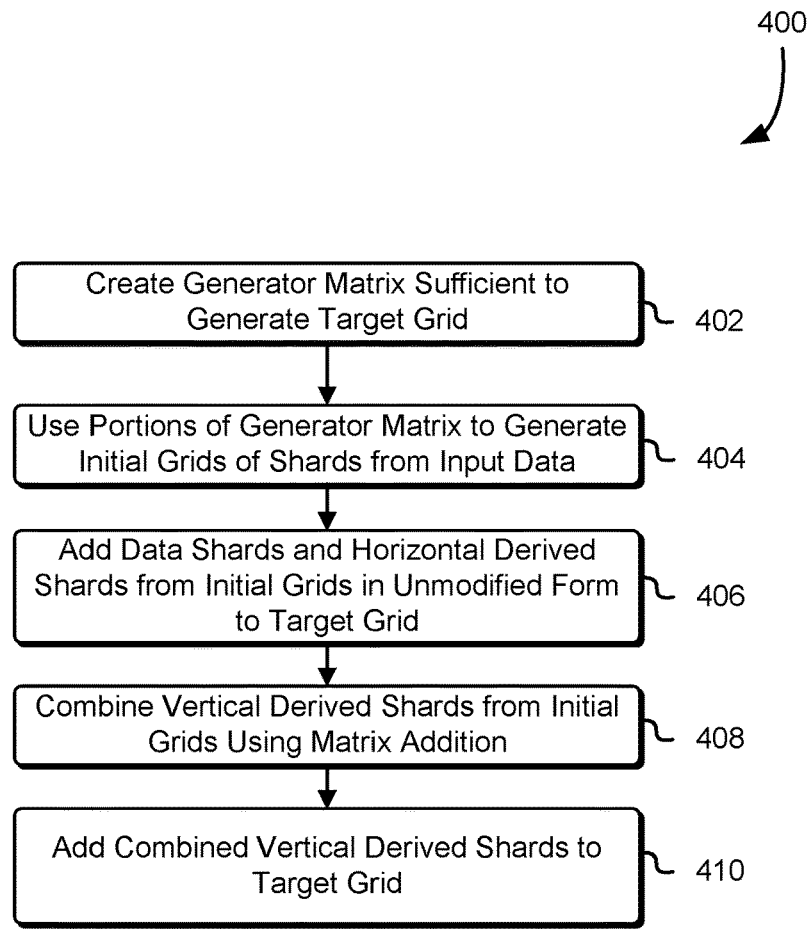
FIG. 4 illustrates an example process for combining shards of two or more initial grids, generated by a generator matrix configured to generate a larger target grid, into a target grid, in accordance with some embodiments.

FIG. 4 illustrates an example process for combining shards of two or more initial grids, generated by a generator matrix configured to generate a larger target grid, into a target grid, in accordance with some embodiments.

At step 402, an entity, such as a grid storage system, creates a generator matrix with sufficient information to generate a grid of the size of the target grid. Such a grid may have a surplus of rows, columns, or shard indices, relative to the size of initial or even target grids, so as to allow for future expansion of generated grids.

At step 404, portions, such as ranges of shard indices, of the generator matrix are used by a system, such a data storage system to generate the initial grids of shards from input data received by the system from, e.g., a customer device. As previously mentioned, the initial grids may be used normally until such a time as it is desired to combine them into a larger target grid, e.g., to accommodate changing system or customer requirements.

At step 406, when the grids are to be combined, the initial grids generated and populated in steps 402 and 404 are combined by, e.g., an entity of a grid storage system, by first allocating the data and horizontally derived shards of each grid to their respective positions in the target grid. In some embodiments, such combination may require little or no computation, as null shards are added to other shards.

At step 408, the vertically derived shards are combined, e.g., by an entity of the grid storage system, using matrix operations such as matrix additions and using techniques described in incorporated disclosures, such as partial sum reconstruction. At step 410, the combined vertically derived shards generated in step 408 are added to their respective positions in the target grid. As may be contemplated, further grids may be added to the target grids, and target grids added to other target grids, so long as they share a common generator matrix and use disparate portions thereof for generation of the shards that populate them.

Figure 5:
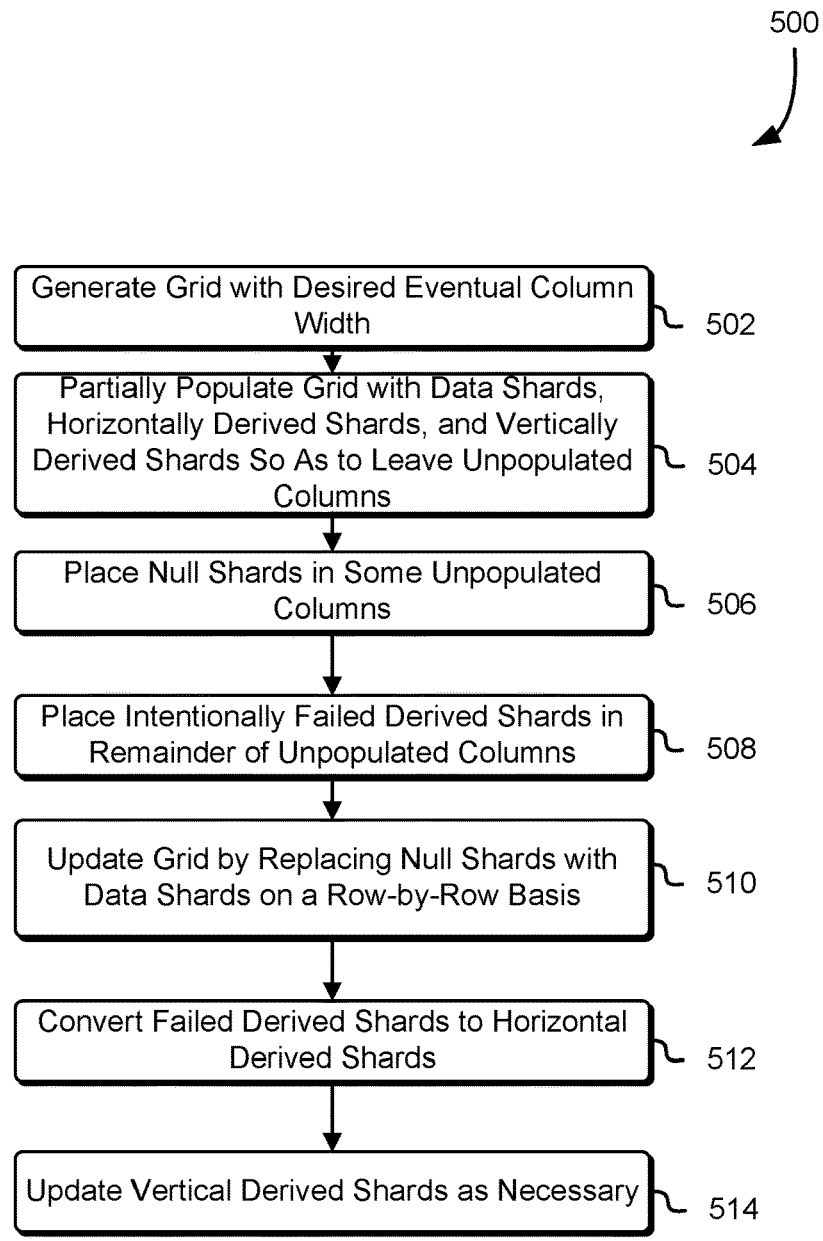
FIG. 5 illustrates an example process for generating a grid of shards that is configurable to be expanded to include additional columns of shards, in accordance with some embodiments.

FIG. 5 illustrates an example process for generating a grid of shards that is configurable to be expanded to include additional columns of shards, in accordance with some embodiments.

At step 502, an entity, such as a grid storage system, generates a grid with the desired eventual column width, and step 504, only some of the columns are populated with data shards and derived shards (e.g., horizontally and vertically derived shards) so as to leave some of the columns unpopulated. As previously mentioned, such population may take place so as to accommodate a desired initial grid encoding, such as 3:2, while the remainder of a desired target grid (e.g., the other three columns in a desired target 6:4 encoding) are populated by the entity with null shards at step 506. At step 508, some of the unpopulated columns are populated, or otherwise treated as, failed derived shards, even if the underlying shard populating that column (e.g., at step 506) is a null shard.

At step 510, in connection with a grid update, e.g., as triggered by additional incoming data where a grid expansion would be desirable, the null shards are replaced, on a row-by-row-basis, with data shards. At step 512, the shards designated as failed derived shards 508 are replaced with active derived shards that are based on the new data shards in the respective row, and at step 514, associated vertically derived shards in the same column as the new data shards are also rederived or otherwise updated.

Figure 6:
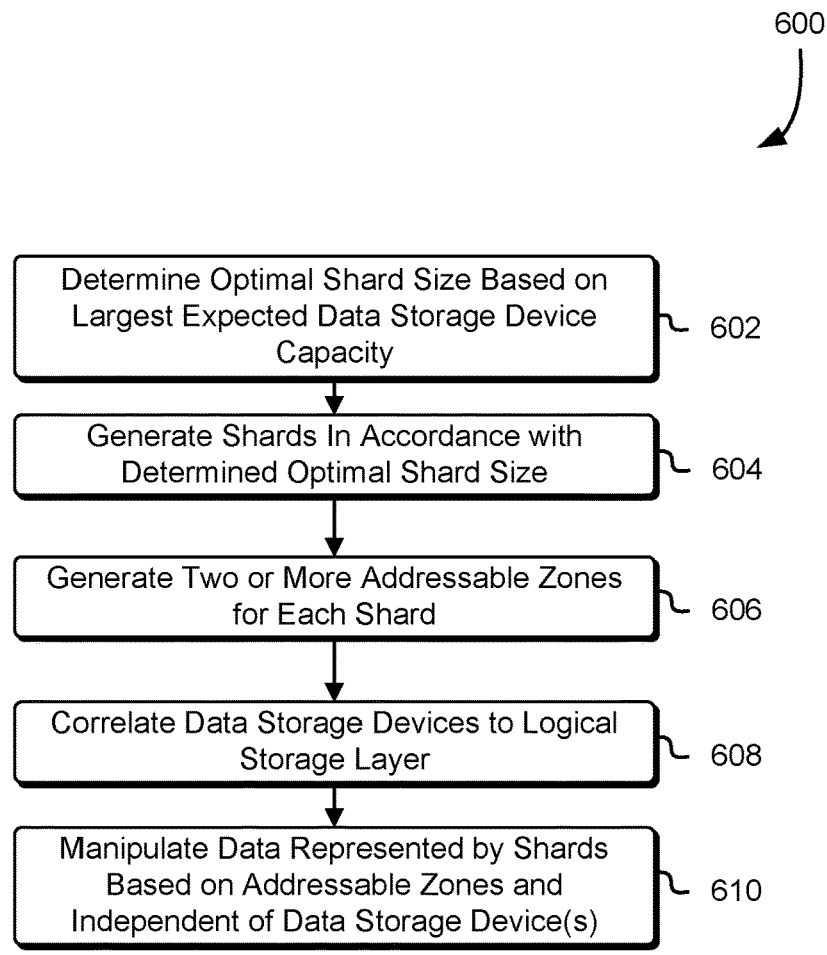
FIG. 6 illustrates an example process for configuring a bundle or grid of shards to be flexibly mapped to a set of data storage devices, in accordance with some embodiments.

FIG. 6 illustrates an example process for configuring a bundle or grid of shards to be flexibly mapped to a set of data storage devices, in accordance with some embodiments.

At step 602, a system, such as a data storage system, determines the optimal shard size to generate based on the smallest expected data storage device capacity of a set of data storage devices to which the generated shards are to be stored. As previously discussed, the optimal shard size may be no larger than the smallest available capacity of any data storage device of the set.

At step 604, the shards are generated by the data storage system in accordance with the optimal shard size determined in step 602, and at step 606, two or more addressable zones of a logical storage layer are associated with each shard. Thereafter, at step 608, the logical storage layer is correlated to the set of data storage devices, such that the boundaries of either the shards or the addressable zones are not necessarily associated with the boundaries of the individual media of the set of data storage devices. At step 610, as data is to be manipulated (e.g., written, read, repaired, the manipulation occurs on a per-addressable zone basis and involves whichever data storage devices are associated with the addressable zones manipulated, and, conversely, if an operation involves a given data storage device, the manipulations (e.g., repairs), occur with relation to the addressable zones.

Figure 7:
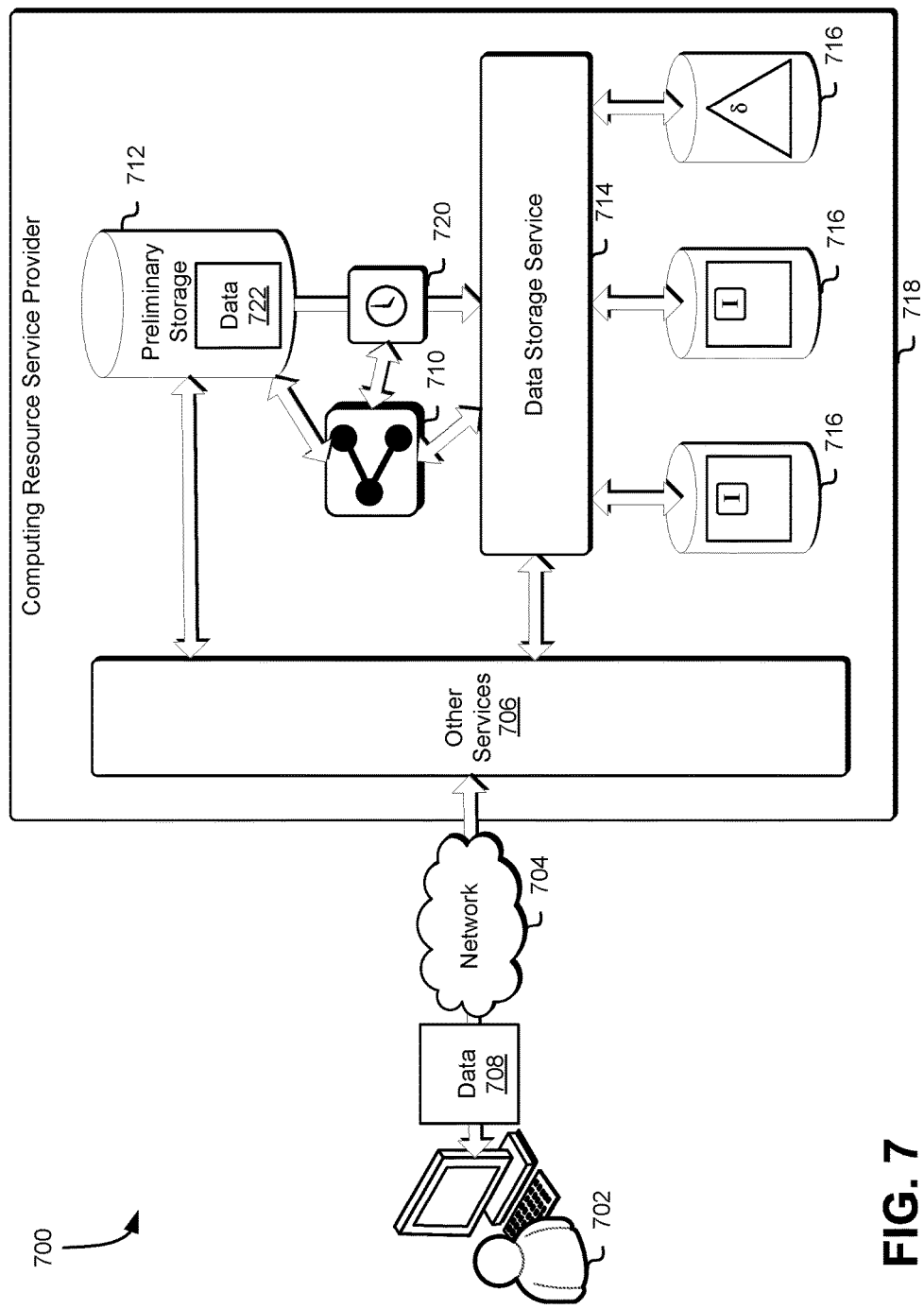
FIG. 7 illustrates an example environment in which a computing resource service provider implements a data storage service, such as a grid storage service, to process and store data transacted therewith, in accordance with some embodiments.

FIG. 7 illustrates an example environment in which a computing resource service provider implements a data storage service, such as a grid storage service, to process and store data transacted therewith, in accordance with some embodiments.

A customer, via a customer device 702, may connect via a network 704 to one or more services 706 provided by a computing resource service provider 718. In some embodiments, the computing resource service provider 718 may provide a distributed, virtualized and/or datacenter environment within which one or more applications, processes, services, virtual machines, and/or other such computer system entities may be executed. In some embodiments, the customer may be a person, or may be a process running on one or more remote computer systems, or may be some other computer system entity, user, or process. The customer device 702 and the network 704 may be similar to that described in connection with at least FIG. 1 above.

The command or commands to connect to the computer system instance may originate from an outside computer system and/or server, or may originate from an entity, user, or process on a remote network location, or may originate from an entity, user, or process within the computing resource service provider, or may originate from a user of the customer device 702, or may originate as a result of an automatic process or may originate as a result of a combination of these and/or other such origin entities. In some embodiments, the command or commands to initiate the connection to the computing resource service provider 718 may be sent to the services 706, without the intervention of the user of the services 706. The command or commands to initiate the connection to the services 706 may originate from the same origin as the command or commands to connect to the computing resource service provider 718 or may originate from another computer system and/or server, or may originate from a different entity, user, or process on the same or a different remote network location, or may originate from a different entity, user, or process within the computing resource service provider, or may originate from a different user of the customer device 702, or may originate as a result of a combination of these and/or other such same and/or different entities.

The customer device 702 may request connection to the computing resource service provider 718 via one or more connections and, in some embodiments, via one or more networks 704 and/or entities associated therewith, such as servers connected to the network, either directly or indirectly. The customer device 702 that requests access to the services 706 may, as previously discussed, include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 704, also as previously discussed, may include, for example, a local network, an internal network, a public network such as the Internet, or other networks such as those listed or described herein. The network may also operate in accordance with various protocols such as those listed or described herein.

The computing resource service provider 718 may provide access to one or more host machines as well as provide access to services such as virtual machine (VM) instances, automatic scaling groups, or file-based database storage systems as may be operating thereon. The services 706 may connect to or otherwise be associated with one or more storage services such as those described herein (e.g., the data storage service 714). The storage services may be configured to provide data storage for the services 706. In an embodiment, the computing resource service provider 718 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 718 may provide a variety of services 706 to the customer device 702, which may in turn communicate with the computing resource service provider 718 via an interface, which may be a web service interface, application programming interface (API), user interface, or any other type of interface. The services 706 provided by the computing resource service provider 718 may include, but may not be limited to, a virtual computer system service, a block-level data storage service, a cryptography service, an on-demand data storage service, a notification service, an authentication service, a policy management service, an archival storage service, a durable data storage service such as the data storage service 714, and/or other such services. Each of the services 706 provided by the computing resource service provider 718 may include one or more web service interfaces that enable the customer device 702 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service or the data storage service 714, and/or to access one or more block-level data storage devices provided by the block-level data storage service).

The block-level data storage service may comprise one or more computing resources that collectively operate to store data for a user using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 718 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The services 706 may produce data, such as data 708 received from the customer device 702, which may be stored 722 in the preliminary storage 712 as described above. In some embodiments, as previously mentioned, the data stored in the preliminary storage may be stored in unaltered form, such as in an identity shard. While the data is stored in the preliminary storage 712, the data 722 may be accessed by the services 706 (e.g., as a result of one or more API requests by the customer device 702) from the preliminary storage 712. After a determined period 270, such as described above in connection with FIG. 1, has passed and the data is migrated to a data storage service 714 provided by the computing resource service provider 718, the data may be accessed using the data storage service 714. In an embodiment where the data may be stored using redundancy encoding technique such as those described herein, the data storage service 714 may retrieve the data from any of the data volumes 716 and/or may reconstruct the data using the redundancy encoding techniques. The data volumes 716 may be magnetic tape, may be optical disks, or may be some other such storage media. As previously discussed and as further discussed herein, the data may be stored in identity shards that correspond individually to volumes, and may also be processed (using the redundancy encoding techniques) so as to create derived shards.

The data storage service 714 may store the data 722 in the preliminary storage 712 or may transmit a command that causes a different service (e.g., a block storage service or some other storage service such as those described herein) to store the data 722 in the preliminary storage 712. The data storage service 714 may also cause the data to be migrated from the preliminary storage 712 or may transmit a command that causes a different service to cause the data to be migrated from the preliminary storage 712. The data storage service 714 may also transmit a command or commands to cause a different service to perform other operations associated with making data objects eventually durable including, but not limited to, storing the data objects in the data shards, calculating derived shards, updating bundles, updating grids (i.e., updating horizontal, vertical, and other bundles of multiply bundled data), and/or other such operations.

In an embodiment, the preliminary storage 712 is a data storage volume such as, for example, a magnetic disk drive (e.g., a spinning disk drive or a solid state disk drive), computer system memory, magnetic tape, or some other optical storage device. In another embodiment, the preliminary storage 712 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 712 described herein are illustrative examples and other types of data storage volumes used for the preliminary storage 106 may be considered as within the scope of the present disclosure.

In an embodiment, the preliminary storage 712 is a plurality of storage devices that are used to redundantly store the data using techniques such as, for example, bundle encoding, grid encoding, or replicated storage. For example, the preliminary storage 712 may store the data by distributing the data to a plurality of data shards (e.g., putting a first portion of the data in a first data shard and a second portion of the data in a second data shard) and generating one or more derived shards based on those data shards. In another embodiment, the preliminary storage 112 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 716 using the data storage service 714 as described herein.

The set of data may be stored in the preliminary storage 712 in an unaltered form (e.g., not processed, compressed, indexed, or altered prior to storage). The set of data may also be stored in the preliminary storage 712 as, for example, original data (also referred to herein as an "identity shard") such as the original data shards described herein. In an embodiment, the set of data stored in the preliminary storage 712 is stored without indexing and without any redundancy encoding. In another embodiment, the set of data stored in the preliminary storage 712 is stored with null redundancy encoding (i.e., a redundancy encoding that maps the data to itself). The data in preliminary storage may be stored as raw data, or may be bundle-encoded, or may be grid-encoded, or may be stored using some other method.

In an embodiment, data can be migrated from preliminary storage to the data storage service 712 as a result of an event such as, for example, a request by a customer to store the data in the data storage service 714. Other events may also be used to cause the migration of the data from preliminary storage 712 to the data storage service 714 such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time. As may be contemplated, the criteria for initiating the migration from preliminary storage described herein are illustrative examples and other such criteria for initiating the migration from preliminary storage may be considered as within the scope of the present disclosure.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object will not unintentionally become unavailable such as, for example, basing the durability on the probability that a data object will unintentionally become unavailable. As may be contemplated, the methods of determining durability of data described herein are merely illustrative examples and other such methods of determining durability of data may be considered as within the scope of the present disclosure.

In an embodiment, a separate service 710 can be configured to monitor the elapsed time 720 associated with the data objects in preliminary storage 712 and, based on a desired durability, cause the data storage service 714 to cause the data to be migrated from the preliminary storage 712 to the durable storage by, for example, transmitting a message to the data storage service. This separate service may operate asynchronously to enforce time limits for all such data stored in preliminary storage.

Figure 8:
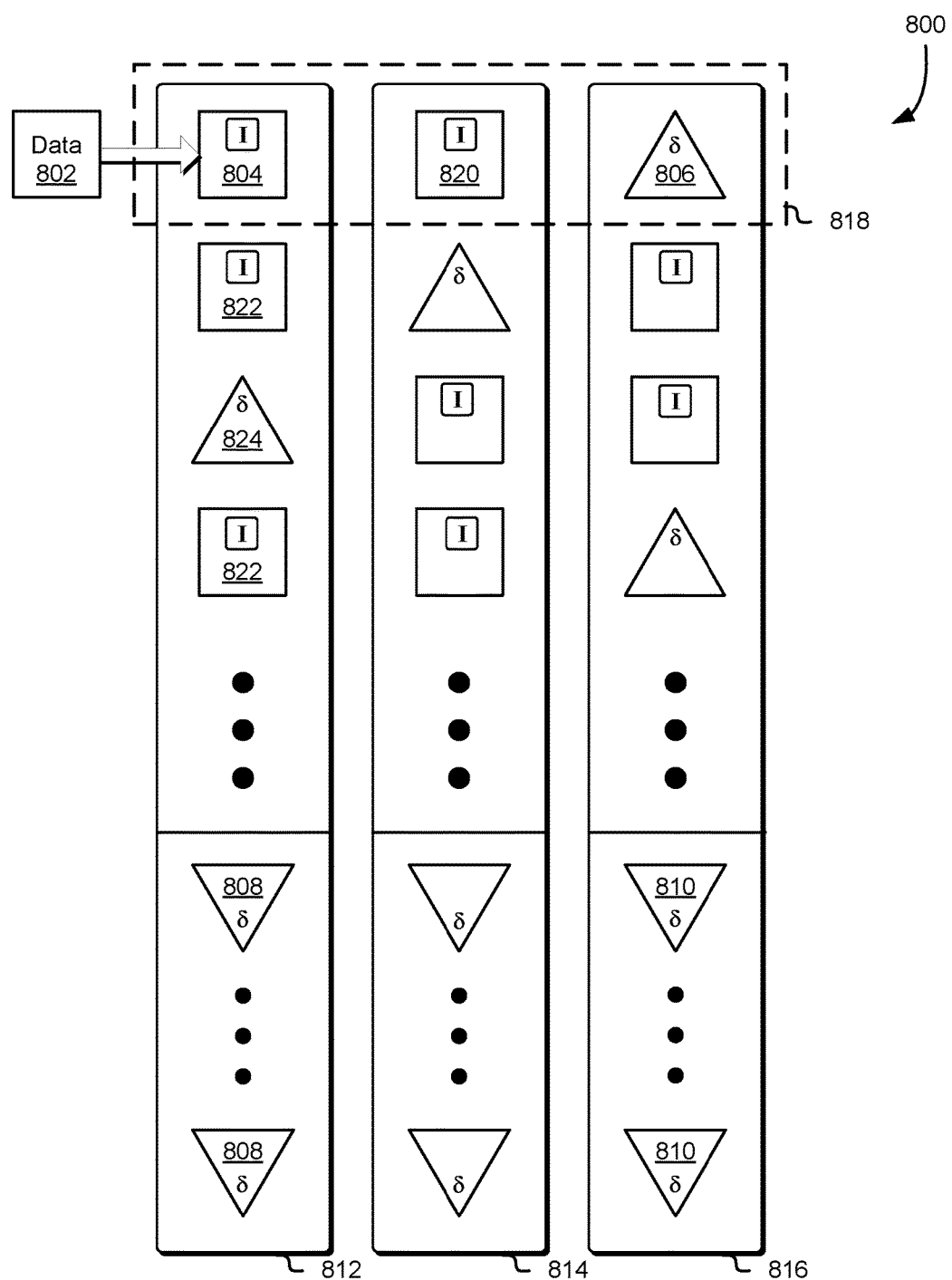
FIG. 8 illustrates an example environment where a redundancy encoding technique is applied to data stored in durable storage in accordance with at least one embodiment.

FIG. 8 illustrates an example environment 800 where a redundancy encoding technique is applied to data stored in durable storage as described in connection with FIGS. 1-7 and in accordance with an embodiment. The redundancy encoding technique illustrated in FIG. 8 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 8, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR," which is incorporated by reference herein.

In the example illustrated in FIG. 8, data 802 from preliminary storage is provided for storage in durable storage using a redundancy encoding technique with both horizontal derived shards and vertical derived shards. In the example illustrated in FIG. 8, a first datacenter 812 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 812. A second datacenter 814, which may be geographically and/or logically separate from the first datacenter 812, may also contain data shards, horizontal derived shards, and/or vertical derived shards. A third datacenter 816, which may be geographically and/or logically separate from the first datacenter 812 and from the second datacenter 814, may also contain data shards, horizontal derived shards, and/or vertical derived shards. As illustrated in FIG. 8, each of the three datacenters may be a single vertical bundle. In an embodiment, each of the datacenters can include multiple vertical bundles. As may be contemplated, the number of datacenters illustrated in FIG. 8 and/or the composition of the datacenters illustrated in FIG. 8 are merely illustrative examples and other numbers and/or compositions of datacenters may be considered as within the scope of the present disclosure. The datacenters may be co-located or may be located in one or more separate datacenter locations.

In the example illustrated in FIG. 8, the data 802 may be copied to a data shard 804 and, as a result of the change to the data in the data shard 804, a horizontal derived shard 806 associated with the data shard 804 may be updated so that the horizontal derived shard 806 may be used to reconstruct the data shard 804 in the event of a loss of the data shard 804. In the example illustrated in FIG. 8, the three shards enclosed by the dotted line (e.g., the data shard 804, the data shard 820, and the horizontal derived shard 806) are a horizontal bundle 818. In this example, the data shard 820 is not affected by the changes to the data shard 804 but the horizontal derived shard 806 may need to be updated as a result of the changes to the data shard 804.

Also as a result of the change to the data in the data shard 804, one or more vertical derived shards 808 related to the data shard 804 may also be updated so that the vertical derived shards 808 may be used to reconstruct the data shard 804 in the event of a loss of the data shard 804 and the horizontal derived shard 806. In the example illustrated in FIG. 8, the shards in datacenter 812 form a vertical bundle. In this example, the other data shards 822 in the vertical bundle and/or the horizontal derived shards 824 in the vertical bundle are not affected by the changes to the data shard 804 but the vertical derived shards 808 may need to be updated as a result of the changes to the data shard 804. Finally, as a result of the change to the horizontal derived shard 806, one or more vertical derived shards 810 related to the horizontal derived shard 806 in the vertical bundle in datacenter 816 may also be updated so that the vertical derived shards 810 may be used to reconstruct the horizontal derived shard 806 in the event of a loss of the horizontal derived shard 806 and the data shard 804.

Figure 9:
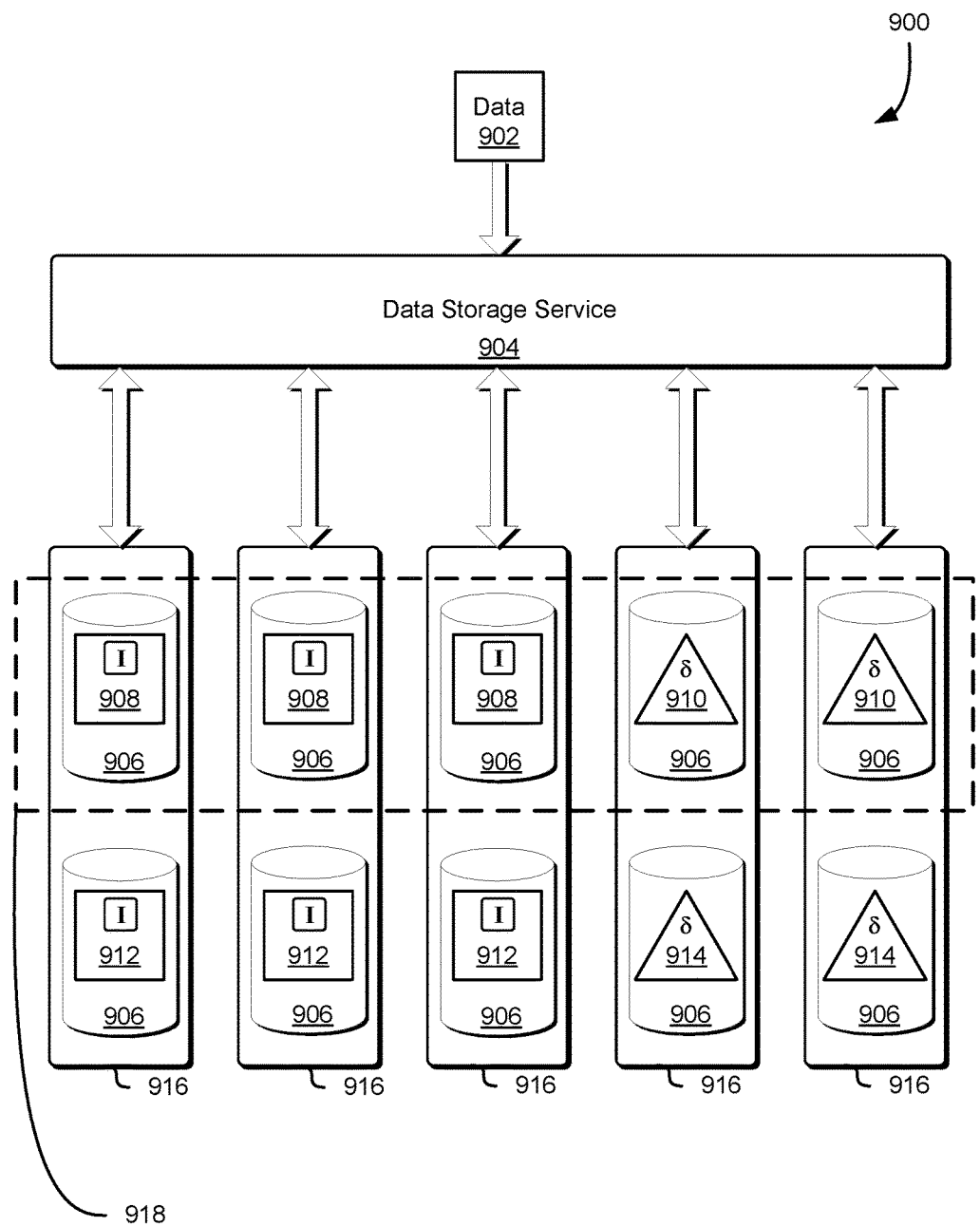
FIG. 9 illustrates an example environment where a redundancy encoding technique is applied to data stored in durable storage in accordance with at least one embodiment.

FIG. 9 illustrates an example environment 900 where a redundancy encoding technique is applied to data stored in durable storage as described herein and in accordance with at least one embodiment. The redundancy encoding technique illustrated in FIG. 9 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 902 from preliminary storage may be sent to a data storage system 904 for redundant storage. The data 902 may be provided from the preliminary storage by any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like.

The data storage system 904 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like. In some embodiments, the resources of the data storage system 904, as well as the data storage system 904 itself, may be one or more resources of a computing resource service provider, such as that described in further detail below. In some embodiments, the data storage system 904 and/or the computing resource service provider provides one or more archival storage services and/or data storage services, such as those described herein, through which a client entity may provide data such as the data 902 for storage in preliminary storage and/or the data storage system 904.

Data 902 may include any quantity of data in any format. For example, the data 902 may be a single file or may include several files. The data 902 may also be encrypted by, for example, a component of the data storage system 904 after the receipt of the data 902 in response to a request made by a customer of the data storage system 904 and/or by a customer of computing resource service provider.

The data storage system 904 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 904), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 904, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 904. For example, a data storage system 904 may generate a dense index for archives over a specified size (as the size of the index itself may be small relative to the number of archives stored on a given volume), and may also generate a sparse index for archives under that specified size (as the ratio of index size to archive size increases).

The data storage system 904 is connected to or includes one or more volumes 906 on which archives or identity shards may be stored. The generated indices for the archives may also be stored on the one or more volumes 906. The volumes 906 may be any container, whether logical or physical, capable of storing or addressing data stored therein. In some embodiments, the volumes 906 may map on a one-to-one basis with the data storage devices on which they reside (and, in some embodiments, may actually be the data storage devices themselves). In some embodiments, the size and/or quantity of the volumes 906 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 906, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 906.

In some embodiments, the sparse indices are used in connection with information relating to the sort order of the archives so as to locate archives without necessitating the use of dense indices, for example, those that account for every archive on a given volume. Such sort order-related information may reside on the volumes 906 or, in some embodiments, on an entity separate from the volumes 906, such as in a data store or other resource of a computing resource service provider. Similarly, the indices may be stored on the same volumes 906 to which they apply, or, in some embodiments, separately from such volumes 906.

The archives may be stored, bit for bit (e.g., the "original data" of the archives), on a subset of the plurality of volumes 906. Also as mentioned, appropriate indices may also be stored on the applicable subset of the plurality of volumes 906. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 9 illustrates five volumes, three of which contain original data archives 908 and two of which contain derived data 910, such as redundancy encoded data. In the illustrated example, the redundancy code used may require any three shards to regenerate original data, and therefore, a quantity of three volumes may be used to write the original data (even prior to any application of the redundancy code).

The volumes 906 bearing the original data archives 908 may each contain or be considered as shards unto themselves. For example, the data 902 from preliminary storage may be copied directly only to a volume if, as described herein, it is stored in preliminary storage as an identity shard. In embodiments where the sort order-related information and/or the indices are stored on the applicable volumes 906, they may be included with the original data of the archives and stored therewith as shards, as previously mentioned. In the illustrated example, the original data archives 908 are stored as three shards (which may include the respective indices) on three associated volumes 906. In some embodiments, the original data archives 908 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 908 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 9, the five volumes 906 include three volumes that have shards (e.g., identity shards) corresponding to the original data of the original data archives 908, while two have encoded shards corresponding to the derived data 910 (also referred to herein as "derived shards"). As illustrated in FIG. 9, the three original data archives 908, and the two encoded shards corresponding to the derived data 910 form a bundle 918 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 906 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 904, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 904 may locate, based on information regarding the sort order of the archives as stored on the volumes 906, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 904 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 904 may first determine the size of the requested archive, and if the requested archive is larger than or equal to the aforementioned size boundary, the dense index may be used so as to more quickly obtain the precise location of the requested archive.

In some embodiments, the volumes 906 may be grouped such that each given volume has one or more cohorts 916. In such embodiments, a volume set (e.g., all of the illustrated volumes 906) may be implemented such that incoming archives to be stored on the volumes are apportioned to one or more failure-decorrelated subsets of the volume set. The failure-decorrelated subsets may be some combination of the volumes 906 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 916). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 908 and/or original data archives 912), while others store derived data (e.g., derived data 910 and derived data 914). The data storage system 904 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 908 and derived data 910, while others are apportioned to volumes in a different pattern as shown by original data archives 912 and derived data 914. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 10:
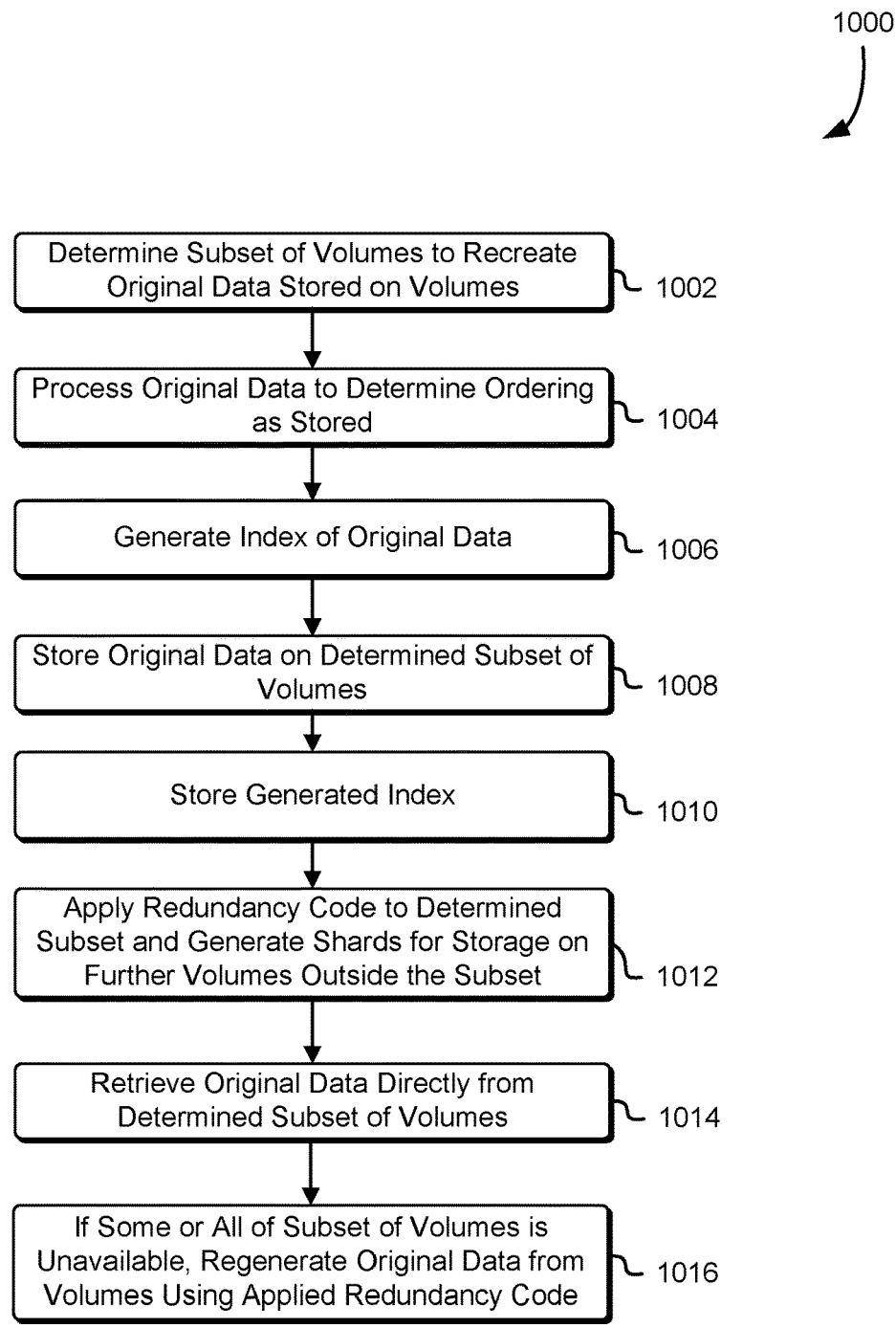
FIG. 10 illustrates an example process for applying redundancy encoding techniques to data stored in durable storage in accordance with at least one embodiment.

FIG. 10 illustrates an example process 1000 for applying redundancy encoding techniques to data stored in durable storage as described herein in connection with FIG. 1 and in accordance with at least one embodiment. The example process 1000 illustrated in FIG. 10 illustrates the processing, indexing, storing, and retrieving of data stored on a data storage system. The data may be retrieved from preliminary storage as described herein. The example process 1000 illustrated in FIG. 10 may be used in conjunction with a grid encoding technique such that described in connection with FIG. 8, in conjunction with a bundle encoding technique such as that described in connection with FIG. 9, or with some other redundancy encoding technique. A data storage service such as the data storage service described herein may perform the example process 1000 illustrated in FIG. 10.

At step 1002, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 9, such information may be derived from predetermining the parameters of an erasure code with a specified ratio of shards that may be used to regenerate the original data from which they derive to the total number of shards generated from the application of the erasure code.

At step 1004, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 1006, one or more indices, such as sparse indices, are generated by, for example, the data storage system, for the original data. For example, there may be more than one index for a given volume, and such parallel indices may be of different types depending on the nature of the archives and/or original data being stored.

At step 1008, the original data is stored, for example, by the data storage system, on the subset of volumes determined in connection with step 1002, and in the order determined in step 1004. Additionally, at step 1010, the index generated in step 1006 is stored, for example, by the data storage system, on an appropriate entity. For example, the index may be stored as part of a shard on which the original data is stored, or, in some embodiments, may be stored on a separate resource from that which persists the volume.

At step 1012, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 1002. For example, the ratio of volumes (e.g., shards as previously described herein) storing the original data to the overall quantity of volumes (including those storing the derived data generated in this step 1012) may be prescribed by the recovery/encoding ratio of the redundancy code applied herein.

At step 1014, in normal operation, requested data may be retrieved, for example, by the data storage system, directly from the subset of volumes storing the original data, without necessitating retrieval and further processing (e.g., by the redundancy code) from the volumes storing the derived data generated in step 1012. However, at step 1016, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 11:
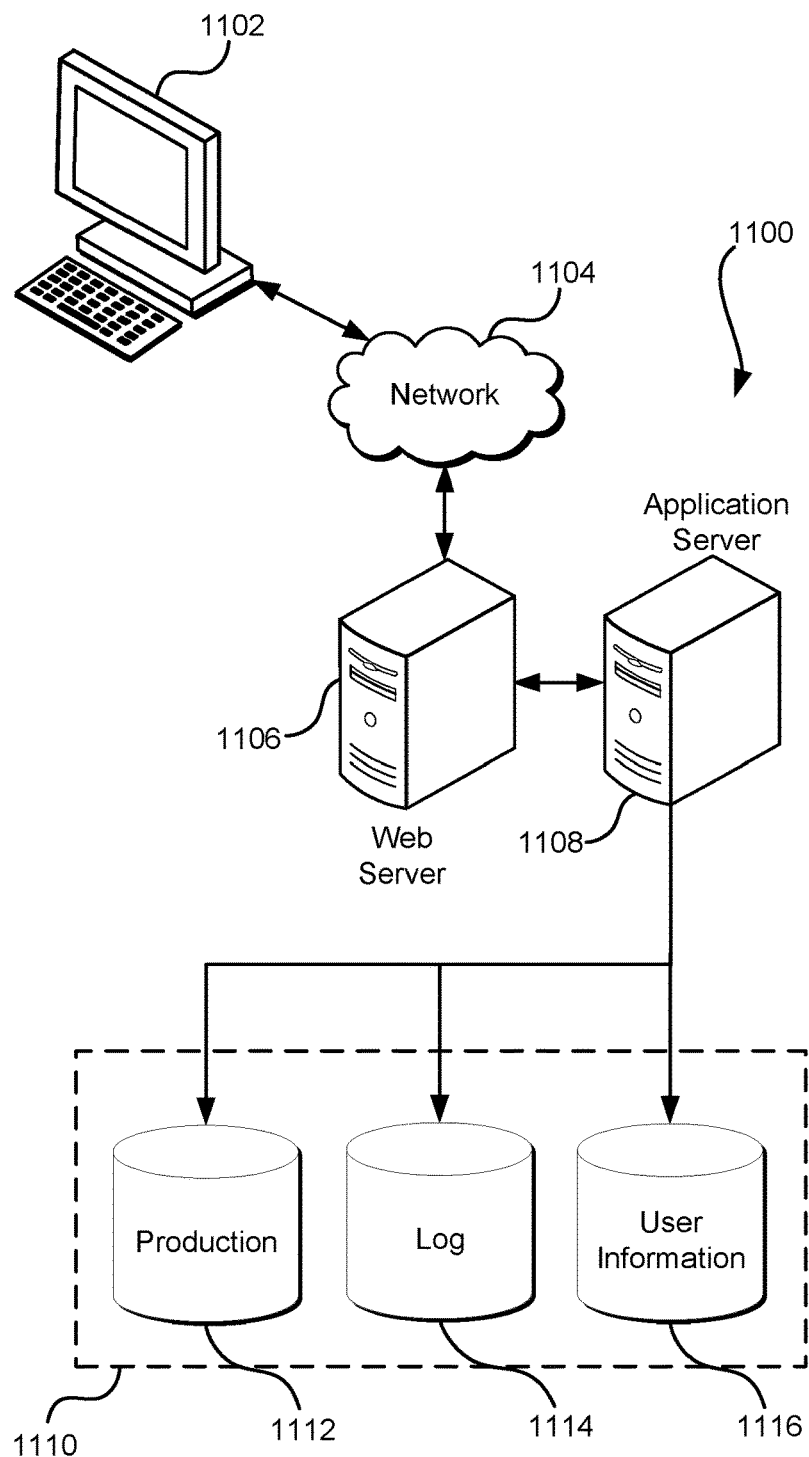
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a first grid of shards to be stored on a plurality of storage devices, the first grid of shards indexed at least by a first index and a second index, the first grid of shards comprising a first set of data shards and a first set of derived shards, wherein each shard of the first grid of shards has a corresponding first index, and a corresponding second index, each shard configured such that the shard is reproducible from other shards associated with the first index and the shard is reproducible from other shards associated with the second index;
    generating a second grid of shards to be stored on the plurality of storage devices, the second grid of shards indexed at least by a third index and a fourth index, the second grid of shards comprising a second set of data shards and a second set of derived shards, wherein each shard of the second grid of shards has a corresponding third index, and a corresponding fourth index, each shard configured such that the shard is reproducible from other shards associated with the third index and the shard is reproducible from other shards associated with the fourth index; and
    combining the first grid and the second grid to form a third grid indexed by a fifth index and a sixth index, the sixth index having a number of members equal to that of the second and fourth indices, by at least:
        allocating the first set of data shards to the third grid;
        indexing the first set of data shards in the third grid with a first subset of the fifth index;
        allocating the second set of data shards to the third grid;
        indexing the second set of data shards in the third grid with a second subset of the fifth index, the second subset of the fifth index being outside of the first subset of the fifth index;
        combining a subset of the first set of derived shards with a corresponding subset of the second set of derived shards to generate a set of combined derived shards;
        allocating the combined derived shards to the third grid; and
        indexing the combined derived shards in the third grid with a third subset of the fifth index, the third subset of the fifth index being outside both the first subset and the second subset of the fifth index.

2. The computer-implemented method of claim 1, further comprising generating the first grid of shards using a first portion of a generator matrix and the second grid of shards using a different portion of the generator matrix.

3. The computer-implemented method of claim 1, further comprising combining the subset of the first set of derived shards with the corresponding subset of the second set of derived shards by using a matrix operation.

4. The computer-implemented method of claim 1, further comprising generating the first grid and the second grid of shards by applying a linear erasure code to data sets to be stored on the respective first or second grid of shards.

5. A system, comprising at least one computing device configured to implement one or more services, wherein the one or more services are configured to:
    generate a first grid of shards to be stored on a plurality of storage devices, the first grid of shards indexed at least by a first index and a second index, the first grid of shards comprising a first set of data shards and a first set of derived shards, wherein each shard of the first grid of shards has a corresponding first index, and a corresponding second index, each shard configured such that the shard is reproducible from other shards associated with the first index and the shard is reproducible from other shards associated with the second index;
    generate a second grid of shards to be stored on the plurality of storage devices, the second grid of shards indexed at least by a third index and a fourth index, the second grid of shards comprising a second set of data shards and a second set of derived shards, wherein each shard of the second grid of shards has a corresponding third index, and a corresponding fourth index, each shard configured such that the shard is reproducible from other shards associated with the third index and the shard is reproducible from other shards associated with the fourth index; and
    combine the first grid and the second grid to form a third grid indexed by a fifth index and a sixth index, the sixth index having a number of members equal to that of the second and fourth indices, by at least:
    allocating the first set of data shards to the third grid;
    indexing the first set of data shards in the third grid with a first subset of the fifth index;
    allocating the second set of data shards to the third grid;
    indexing the second set of data shards in the third grid with a second subset of the fifth index, the second subset of the fifth index being outside of the first subset of the fifth index;
    combining a subset of the first set of derived shards with a corresponding subset of the second set of derived shards to generate a set of combined derived shards;
    allocating the combined derived shards to the third grid; and
    indexing the combined derived shards in the third grid with a third subset of the fifth index, the third subset of the fifth index being outside both the first subset and the second subset of the fifth index.

6. The system of claim 5, wherein the one or more services are further configured to generate the first grid of shards using a first portion of a generator matrix and the second grid of shards using a different portion of the generator matrix.

7. The system of claim 5, wherein the one or more services are further configured to combine the subset of the first set of derived shards with the corresponding subset of the second set of derived shards by using a matrix operation.

8. The system of claim 5, wherein the one or more services are further configured to generate the first grid and the second grid of shards by applying a linear erasure code to data sets to be stored on the respective first or second grid of shards.

9. The system of claim 5, wherein the shards of the subset of the first set of derived shards and the shards of the corresponding subset of the second set of derived shards are vertically-derived shards.

10. The system of claim 9, wherein a remainder of the shards of the first set outside of the subset of the first set of derived shards and the shards of the corresponding remainder of the shards of a second set outside of the subset of the second set of derived shards are allocated to the third grid.

11. The system of claim 5, wherein the services are further configured to generate the first grid of shards and the second grid of shards by processing received data using a redundancy code.

12. The system of claim 5, wherein the plurality of storage devices include at least one of: magnetic tape, magnetic disk, optical disk, a memory resistor, or computer memory.

13. A non-transitory computer-readable storage medium having stored thereon executable instructions that, when executed by one or more processors of a computer system, cause the computer system to at least:
   process data for storage on a first grid of shards and a second grid of shards, the first and second grid of shards each comprising:
      a respective set of data shards;
      a respective set of derived shards;
      a respective first index;
      a respective second index; and
      each shard of the first and second grid of shards having a corresponding identifier in the respective first index and a corresponding identifier in the respective second index, and configured such that:
         the shard is reproducible using only other shards sharing the corresponding identifier in the first index; and
         the shard is reproducible using only other shards sharing the corresponding identifier in the second index; and
   combine the first grid and the second grid to form a third grid indexed by a third index and a fourth index, the fourth index having a number of identifiers equal to that of the respective second indices of the first and second grids if combined, by at least:
      placing the respective sets of data shards for the first and second grid into the third grid;
      combining a subset of the respective set of derived shards of the first grid with a corresponding subset of the respective set of derived shards of the second grid to generate a set of combined derived shards; and
      placing the combined derived shards in the third grid such that the combined derived shards so as to have the same corresponding identifier as in the respective first index of the first grid.

14. The non-transitory computer-readable storage medium of claim 13, wherein:
   the respective set of derived shards includes a first subset of shards that are derived based at least in part on a first linear erasure code, and a second subset of shards that are derived based at least in part on a second linear erasure code.

15. The non-transitory computer-readable storage medium of claim 14, wherein the second subset of shards are derived from other shards that include at least some shards in the first subset of shards.

16. The non-transitory computer-readable storage medium of claim 15, wherein the second subset of shards are associated with identifiers of the second index that are not shared with other identifiers associated with shards outside of the second subset of shards.

17. The non-transitory computer-readable storage medium of claim 15, wherein:
   the first linear erasure code is a parity code; and
   the second linear erasure code is Reed-Solomon.

18. The non-transitory computer-readable storage medium of claim 13, wherein the instructions further include instructions that, when executed, process the data by applying a first subset of a generator matrix of a redundancy code to the data for storage on the first grid of shards.

19. The non-transitory computer-readable storage medium of claim 18, wherein the instructions further include instructions that, when executed, process the data by applying a second subset of the generator matrix, the second subset being outside of the first subset of the generator matrix, to the data for storage on the second grid of shards.

20. The non-transitory computer-readable storage medium of claim 13, wherein the first index corresponds to grid columns.

21. A computer-implemented method, comprising:
   processing data for storage on a first grid of shards and a second grid of shards, the first and second grid of shards each comprising:
      a respective set of data shards;
      a respective set of derived shards;
      a respective first index;
      a respective second index; and
      each shard of the first and second grid of shards having a corresponding identifier in the respective first index and a corresponding identifier in the respective second index, and configured such that:
         the shard is reproducible using only other shards sharing the corresponding identifier in the first index; and
         the shard is reproducible using only other shards sharing the corresponding identifier in the second index; and
   combining the first grid and the second grid to form a third grid indexed by a third index and a fourth index, the fourth index having a number of identifiers equal to that of the respective second indices of the first and second grids if combined, by at least:
      placing the respective sets of data shards for the first and second grid into the third grid;
      combining a subset of the respective set of derived shards of the first grid with a corresponding subset of the respective set of derived shards of the second grid to generate a set of combined derived shards; and
      placing the combined derived shards in the third grid such that the combined derived shards so as to have the same corresponding identifier as in the respective first index of the first grid.

22. The computer-implemented method of claim 21, wherein the respective set of derived shards includes a first subset of shards that are derived based at least in part on a first linear erasure code, and a second subset of shards that are derived based at least in part on a second linear erasure code.

23. The computer-implemented method of claim 22, wherein the second subset of shards are derived from other shards that include at least some shards in the first subset of shards.

24. The computer-implemented method of claim 23, wherein the second subset of shards are associated with identifiers of the second index that are not shared with other identifiers associated with shards outside of the second subset of shards.

25. The computer-implemented method of claim 23, wherein:
   the first linear erasure code is a parity code; and
   the second linear erasure code is Reed-Solomon.

26. The computer-implemented method of claim 21, wherein the first index corresponds to grid columns.

\* \* \* \* \*